US012175408B2

(12) United States Patent
Benayoun et al.

(10) Patent No.: US 12,175,408 B2
(45) Date of Patent: *Dec. 24, 2024

(54) HIERARCHICAL BLOCKCHAIN ARCHITECTURE FOR GLOBAL TRADE MANAGEMENT

(71) Applicant: Questaweb Holdings Inc., Clarksburg, NJ (US)

(72) Inventors: David Benayoun, Parkland, FL (US); Leon Turetsky, Bedminster, NJ (US); Jonathan Pekar, La Jolla, CA (US); Felix Pekar, Clarksburg, NJ (US); Eric Pekar, Clarksburg, NJ (US); Mary Benayoun, Parkland, FL (US)

(73) Assignee: Questaweb Holdings Inc., Clarksburg, NJ (US)

( * ) Notice: Subject to any disclaimer, the term of this patent is extended or adjusted under 35 U.S.C. 154(b) by 407 days.

This patent is subject to a terminal disclaimer.

(21) Appl. No.: 17/715,919

(22) Filed: Apr. 7, 2022

(65) Prior Publication Data

US 2022/0230131 A1 Jul. 21, 2022

Related U.S. Application Data

(63) Continuation of application No. 16/156,916, filed on Oct. 10, 2018, now Pat. No. 11,341,451.

(51) Int. Cl.
*G06Q 10/0831* (2023.01)
*G06F 9/455* (2018.01)
(Continued)

(52) U.S. Cl.
CPC ..... *G06Q 10/0831* (2013.01); *G06F 9/45558* (2013.01); *G06Q 20/06* (2013.01);
(Continued)

(58) Field of Classification Search
CPC .. G06Q 10/0831; G06Q 20/06; G06Q 30/018; G06F 9/45558
See application file for complete search history.

(56) References Cited

U.S. PATENT DOCUMENTS 7,137,006 B1 * 11/2006 Grandcolas ......... H04L 63/0815
713/180
10,026,082 B2 * 7/2018 Davis ..................... G06Q 20/10
(Continued)

FOREIGN PATENT DOCUMENTS

| CA | 3027630 A1 | 1/2018 |
|----|------------|--------|
| WO | WO2018144302 A1 | 8/2018 |

(Continued)

OTHER PUBLICATIONS

Collett, Romain, "Smart Contracts: The Use of the Blockchain Technology in Trade Finance", Bachelor Project Aug. 24, 2018, pp. 1-143, Haute ecole de gestion de Geneva (HEG-GE), International Business Management Geneva Switzerland (Year: 2018).*

(Continued)

*Primary Examiner* — Daniel S Felten
(74) *Attorney, Agent, or Firm* — DLA PIPER LLP (US); Blake W. Jackson; Thomas L. Fuller

(57) ABSTRACT

Described is a reactive hierarchical blockchain architecture, system, and methodology for Global Trade Management (GTM). The system includes a comprehensive suite of GTM applications and leverages multi-national content to deliver efficient cross-border transactions anywhere in the world. The tiered computer-implemented system and method allow development of distributed GTM blockchain solutions capable of processing enormous amounts of global content at scale to meet huge transaction volume. The hierarchical blockchain architecture further assures scalability of the GTM solutions described herein by reducing the need for performing extensive calculations on multiple blockchain (Continued)

nodes. The GTM blockchain systems can be standalone or they can feed information into one or more main International Trade (ITC) blockchains. Smart contracts for specific GTM operations are segregated among appropriate childchains and verified by integrated GTM applications executed on permissioned nodes.

17 Claims, 10 Drawing Sheets

(51) Int. Cl.
  *G06Q 20/06*  (2012.01)
  *G06Q 30/018*  (2023.01)
  *H04L 9/00*  (2022.01)
  *H04L 9/06*  (2006.01)

(52) U.S. Cl.
  CPC ......... *G06Q 30/018* (2013.01); *H04L 9/0637* (2013.01); *H04L 9/0643* (2013.01); *G06F 2009/45595* (2013.01); *H04L 9/50* (2022.05)

(56) References Cited

U.S. PATENT DOCUMENTS

| | | | |
|---|---|---|---|
| 10,417,217 B2 | 9/2019 | Pierce et al. | |
| 10,515,409 B2 | 12/2019 | Creighton, IV et al. | |
| 10,536,445 B1 | 1/2020 | Lerner | |
| 10,628,768 B2* | 4/2020 | Bosanquet | G06Q 30/0216 |
| 10,783,082 B2 | 9/2020 | Yao | |
| 10,783,116 B2 | 9/2020 | Wong et al. | |
| 10,841,213 B2 | 11/2020 | Chen et al. | |
| 10,942,756 B2 | 3/2021 | Wang | |
| 10,958,637 B2 | 3/2021 | Cage et al. | |
| 11,063,747 B2 | 7/2021 | Troia et al. | |
| 11,102,011 B2 | 8/2021 | Qiu | |
| 11,108,553 B2 | 8/2021 | Irazabal et al. | |
| 11,195,180 B2 | 12/2021 | Jiang et al. | |
| 11,200,545 B2* | 12/2021 | Subramaniam | G06Q 20/36 |
| 11,354,658 B2* | 6/2022 | Lyons | G06Q 20/102 |
| 11,775,977 B1* | 10/2023 | Kruse | G06Q 20/4014 705/40 |
| 11,803,849 B1* | 10/2023 | Lawrence | G06Q 40/03 |
| 2016/0342976 A1* | 11/2016 | Davis | G06Q 20/10 |
| 2017/0214699 A1* | 7/2017 | Johnsrud | H04L 9/3236 |
| 2017/0228822 A1 | 8/2017 | Creighton, IV et al. | |
| 2017/0262862 A1 | 9/2017 | Aljawhari | |
| 2018/0082290 A1 | 3/2018 | Allen et al. | |
| 2018/0268479 A1* | 9/2018 | Dowling | G06Q 40/03 |
| 2019/0028276 A1 | 1/2019 | Pierce et al. | |
| 2019/0251199 A1 | 8/2019 | Klianev | |
| 2019/0340586 A1 | 11/2019 | Sheng et al. | |
| 2020/0074419 A1* | 3/2020 | Govender | G06Q 20/367 |
| 2020/0118068 A1* | 4/2020 | Turetsky | G06F 9/45558 |
| 2020/0302410 A1 | 9/2020 | MacGregor et al. | |
| 2020/0043007 A1 | 11/2020 | Simons | |
| 2020/0396065 A1 | 12/2020 | Gutierrez-Sheris | |
| 2021/0398093 A1* | 12/2021 | Lynch | G06Q 20/389 |
| 2022/0015846 A1* | 1/2022 | Li | A61B 34/30 |
| 2022/0129912 A1* | 4/2022 | Smith | G06Q 50/26 |
| 2023/0186300 A1* | 6/2023 | Collins | G06Q 20/102 705/79 |
| 2023/0360072 A1* | 11/2023 | Simpson | H04W 4/021 |
| 2024/0118702 A1* | 4/2024 | Cella | G05B 19/4155 |

FOREIGN PATENT DOCUMENTS

| | | | | |
|---|---|---|---|---|
| WO | WO 2020/023441 | * | 1/2020 | ............ G06Q 10/08 |
| WO | WO2020023441 A1 | | 1/2020 | |
| WO | WO2021026174 A1 | | 2/2021 | |

OTHER PUBLICATIONS

Takahashi, Koji, "Blockchain Technology for Letters of Credit and Escrow Arrangements" The Banking Law Journal, Feb. 1, 2018, pp. 89-103, vol. 135, No. 2 Lexis Nexis, New York, NY USA (Year: 2018).*
Napier, G., "Global Trade Management: Redefining the Successful Execution of International Logistics", Inbound Logistics, Jan. 1, 2006, 3 pages.
McNeill., et al., "Global Trade Management Landscape of Vendors," AMR Research, Sep. 2009, 16 pages.

* cited by examiner

HIERARCHICAL BLOCKCHAIN ARCHITECTURE FOR GLOBAL TRADE MANAGEMENT

PRIORITY CLAIMS/RELATED APPLICATIONS

This application is a Continuation of U.S. patent application Ser. No. 16/156,916 filed Oct. 10, 2018, entitled "Hierarchical Blockchain Architecture for Global Trade Management," the entirety of which is incorporated herein by reference.

FIELD OF INVENTION

The present disclosure generally relates to distributed data structures and automated transaction protocols. In particular, the invention describes a tiered computer-implemented system that leverages a hierarchical blockchain architecture to provide GTM solutions.

BACKGROUND

Global trade management (GTM) is the total optimization of all cross-border regulatory, strategic, and system components involved in bringing a product to market. Effective GTM solutions streamline all stages of product development from product conception to final delivery to ensure a seamless, secure and cost-effective flow of goods, data, and payments. In general, GTM is comprised of equal parts risk management and trade optimization. Trade optimization aspects include best practices associated with import duty-tax minimization, reduced cost of trade operations, and optimized logistics and transportation routing. The risk management component encompasses regulatory compliance, trade security, and disruption planning and preparedness.

In particular, GTM is heavily impacted by policies imposed by multiple governmental actors that regulate the international cross-border aspects of moving products. Global and local governmental organizations, as well as industry groups, play a key role in the field by creating and enforcing these laws and regulations. Management decisions and distribution pipeline configurations must be made to both comply with these regulations and leverage them for optimal business performance. Regulatory compliance for manufacturing, shipping, distributing, and other operations associated with getting products to market is one aspect of GTM improved by the solutions described herein.

Another key objective of GTM solutions is to manage import and export related functions including financial transactions associated with cross-border trade and information exchange among the international trade partners. To this end, GTM systems enable information exchange, known as Global Trade Visibility (GTV) or Business Partner Collaboration (BPC). Automating all or part of this information exchange is badly needed to make this information exchange process more efficient.

In general, current GTM solutions are limited by challenges in compliance, connectivity, and content. Low levels of automation throughout the global trade process result in penalties, delays, waste, and lost opportunities for all types of market participants. The lack of established GTM compliance solutions forces business that source goods from overseas to rely on third parties with unproven expertise and unrecorded track records to execute compliance functions in unknown geographic regions. The lack of connectivity across global trade pipelines undermines the ability of purchasers to connect with partners including customs agents and other service providers. The is also no publicly available record of GTM events, for example, logistics, financial, and compliance activities, that would allow global trade participates to precisely track the flow of goods, money, and information across borders. Frequently changing regulatory requirements make keeping trade content current a big challenge. Uncertainty over what laws apply in certain jurisdictions increases security and non-compliance risks.

The fundamental compliance feature of GTM is rooted in the complexity of government, industry, and trade related rules and regulations. The sheer volume of information, analysis, statistical calculations, and other operations required to comply with and compute optimal—or even just suitable—alternatives requires significant time and hardware resources. The amount of data processing required for an effective GTM solution is determination to any existing blockchain. Blockchains are distributed data structures that rely on peer-to-peer network protocols that require each node in the network to run the network virtual machine and execute the same instructions. Such "world computer" types of blockchain networks that require massive parallelization of computing across all nodes in the network compute far slower and at much higher cost than tradition computer systems.

Secondly, government regimes, economic conditions, transportation technology, and many other aspects effecting global trade are in a constant state of flux. New or different policies and regulations enacted in response to changes in one or more of these aspects can significantly impact requirements for GTM solutions. Practically every change to regulations requires an alteration of the program code. Disseminating these changes and updating system functions impacted by the new laws is time consuming and resource intensive for solutions having a manual offline component and systems incorporating distributed networks. Rapidly pushing changes can pollute traffic and overwhelm storage resulting in system failure or non-compliance with regulations. Moreover, even the most rigorous testing of the code cannot guarantee the absence of errors. These errors could make GTM systems vulnerable, inaccurate, or otherwise seriously disrupt the whole operation of a blockchain network component. To keep customers in compliance with current laws, GTM solutions need to be agile and quickly adaptable.

Despite scalability challenges and the complications associated with updating system functionality, integrating blockchain technology into GTM processes provides tremendous advantages. By implementing a decentralized consensus protocol for executing transactions, distributed systems for GTM would provide extreme levels of fault tolerance, zero downtime, and an immutable, censorship-resistant record of GTM events. GTM solutions that intelligently distribute data storage, transaction verification, and asset delivery across a distributed network of many nodes would be more reliable, secure, and accessible than existing solutions.

Incorporating blockchain technology into GTM applications would also address the compliance, connectivity, and content problems plaguing existing GTM processes. Smart contracts deployed on the blockchain would help automate many simple compliance tasks thereby reducing the number of penalties, delays, and opportunities lost because of slow, heavily intermediated manual transaction verification and settlement frameworks. Implementing a public or federated blockchain for tracking major GTM events would connect geographically dispersed participants in global by providing an unchangeable, censorship-resistant record of logistics, finance, and compliance actions and the parties performing such actions. This distributed database could be freely accessible anywhere in the world and would always maintain the same state for all users regardless of location or time of access. Developing a hierarchical blockchain architecture to selectively distribute more detailed information about specific GTM sectors to sidechains and childchains instead of one monolithic subchain or mainchain would allow the advantages of distributed systems to be realized at scale.

BRIEF SUMMARY OF INVENTION

This GTM model allows a company to position trade security and preparedness planning as an "upstream" strategy where, for instance, input on new product sourcing could also include considerations for terrorist risk, port security, vendor screening, and geopolitical stability. Even such issues as multi-currencies, multi-time zones, and multiple languages could fall under this strategy. In essence, GTM converts global trade programs from a potential liability into a much-needed competitive advantage.

It is an object of the present invention to provide practical method and computer system for global trade management based on blockchain technology, in order to obtain efficient, secure, and compliant flow of goods across international borders, providing global compliance visibility and workflow control.

It is an object of the present invention to provide a hierarchical blockchain architecture for GTM that retains the fault tolerance, reliability, and security of traditional blockchain systems and can be scaled to process large volumes of compliance, customs clearance, movement of goods, and inventory management transactions.

It is a further object of the present invention to provide a plurality of self-sustaining childchain blockchains specific to categories of GTM operations that are self-sustaining, permissioned, and reconcilability with a main GTM subchain via a chain relay or two-way peg.

It is a further object of the present invention to provide a suite of GTM smart contracts including movement of goods contracts, agents services contracts, import and export compliance contracts, and duty management contracts that perform one or more GTM operations, for example, coordination of multiple parties to authenticate and execute documents, validate results a of database screening, calculation, or other data analysis process, record transaction information and event milestones generated at the completion of one or more GTM operations to multiple, and submit evidence of compliance activities to government agencies.

It is a further object of the present invention to provide a hierarchical blockchain system having one or more childchain components that interfaces with an oracle, distributed data storage platform, or off-chain GTM software module to incorporate, verify, or record results from off-chain operations performed by GTM software running on a local machine, closed access government agencies, manually by a non-government actor, or some combination.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION OF INVENTION

Figure 1:
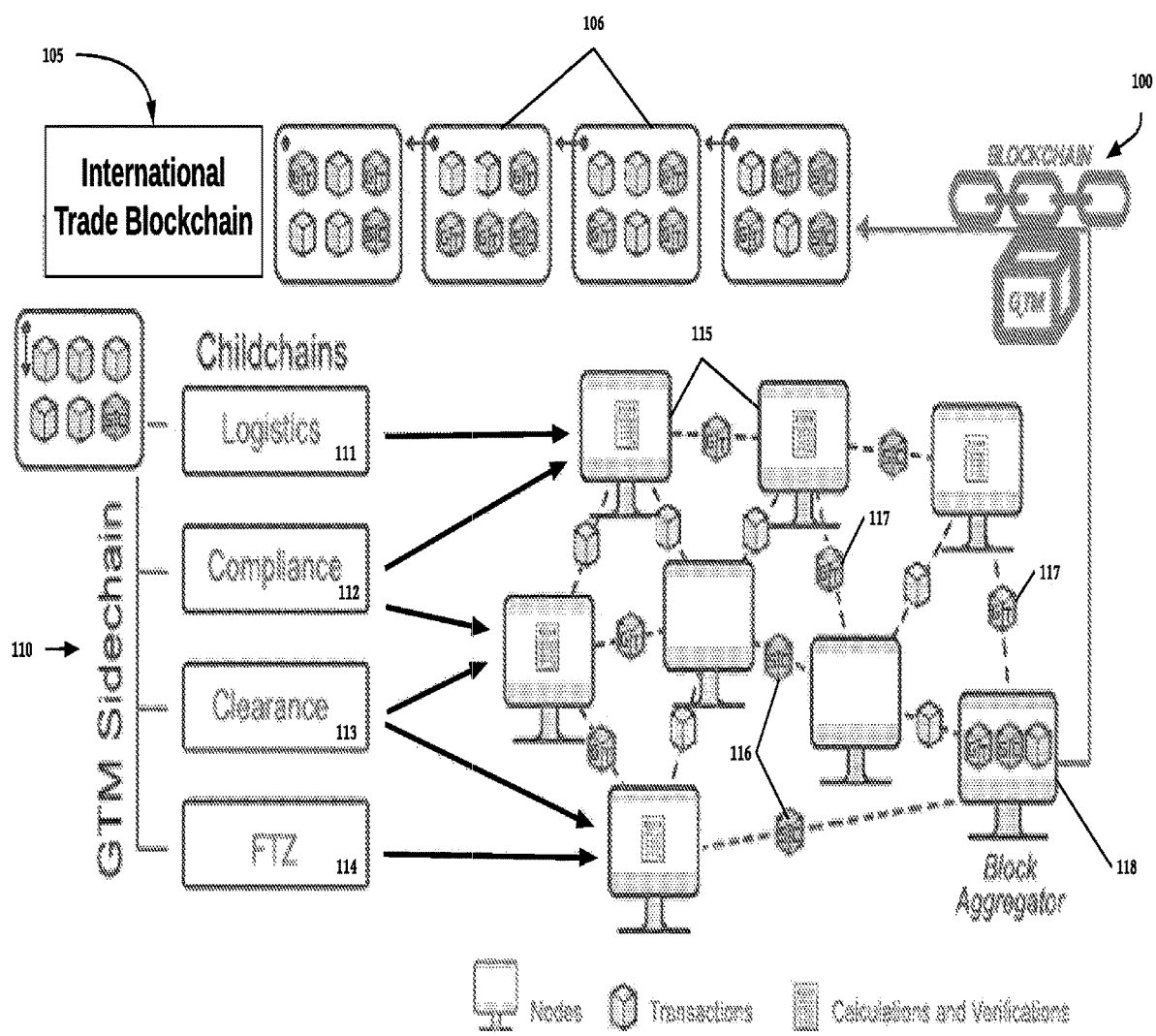
FIG. 1 illustrates a hierarchical blockchain architecture for GTM.

Blockchains and distributed ledgers are two types of distributed data structures. These data frameworks enhance security by shifting the responsibility of maintaining and protecting data from a centralized authority to a consensus of distributed nodes. By decentralizing data storage, blockchains and distributed ledgers can significantly reduce the cost of trust and reduce reliance on traditional third-party intermediaries that may lack incentives or knowledge necessary to secure the data they hold. Banks, governments, cloud storage providers, and centralized exchanges and marketplaces are a few traditional businesses that must adopt distributed trust and storage solutions or risk becoming obsolete.

A distributed ledger is a database spread across multiple nodes or computing devices. Each node replicates and saves an individual copy of the ledger. Participating nodes update their copies of the ledger independently based on the outcome of a consensus vote that considers the information each individual node believes is accurate. Nodes in most distributed ledger systems vote automatically through a consensus protocol. Once consensus is established, the distributed ledger is updated by saving the latest, consensus version of the ledger on each node separately. Distributed ledgers are more reliable and difficult to manipulate than centralized data structures because nefarious actors must compromise a significant percentage of nodes rather than a single centralized data center to corrupt the ledger. Depending on the parameters of the consensus algorithm used for updating the ledger, at least 33% to 51% of participating nodes must be compromised to allow corruption. Accordingly, attempts to hack distributed ledgers are commonly referred to as 51% attacks.

Blockchains are one form of distributed ledger technology that provides a secure and valid consensus among distrusting parties. A blockchain is an append-only distributed digital ledger that consists of a continuously growing chain of linked blocks, wherein each block contains a cryptographic hash of the previous block, a timestamp, and batches of verified transactions. Cryptographic hashes included in blocks include a pointer, for example, the address of the previous block, and a hash of the data included inside the previous block. Currently, most blocks include one or more batches of transaction information, for example, transacting parties, transacted assets, transaction time, security confirmations, and wallet address sending and receiving collateral. Any type of data, however, can be stored in a blockchain or other distributed data structure.

Hashing functions used to generate block hashes may have many different properties. Generally, hashing functions are mathematical functions which convert a variable length input string into a fixed length binary sequence. Blockchain hashing functions are typically, deterministic, collision resistant, rapidly computable, one way, and pre-image resistant. Deterministic hashing functions always generate a unique output for every particular input into the hash function, meaning the same input will always hash to the same output and small changes to the input will hash to a different result. One way hashing functions are designed to make reversing the hash function very difficult, that is finding a string that hashes to a given value. Similarly, pre-image resistant hashing functions are difficult to reverse engineer even if the resulting hash is known. To be functional at scale, blockchains must be able to process huge quantities of data therefore, hashing functions need to be collision resistant, difficult to generate the same hash from two different inputs, and rapidly computable with low resource costs.

This system of linking blocks using hashes of data contained in previous blocks creates highly secure and fault-tolerant digital records. Block hashes contained in each new block depend on the hashes in the headers of all previous blocks. Therefore, it is impossible to change a current or new block without affecting all subsequent blocks. Records contained in blockchains on highly decentralized networks are immutable because they cannot be altered once they are created without affecting the current blockchain state. Corrupting blockchain data in real time is only possible if one party controls the vast majority of nodes in the network. This computational reality makes unilateral changes to the blockchain state infeasible in distributed networks resulting in amazing security potential for blockchain systems.

Each new block is a snapshot of the chain's current state at the time the block was published. To publish a new block, consensus among participating nodes about the block's content must be achieved using a consensus algorithm. To incentivize nodes to perform extensive operations, practically all blockchains offer mining rewards. Miners validate new transactions and record them on the global ledger (blockchain). The solution found by mining is called the Proof-Of-Work. This proof proves that a miner did spend a lot of time and resources to solve the problem. When a block is 'solved', the transactions contained are considered confirmed. Miners can receive two types of rewards: new crypto coins or transaction fees. In the GTM blockchain, this is especially true for collecting and proving international compliance content which is an extremely time- and resource-consuming endeavor.

When a participating node in a distributed data structure wishes to change the state of the ledger of that network, for example, to transfer blockchain compatible tokens or other collateral on-chain from one ariess to another, it creates and transmits a value transaction record to other nodes in the network. Over time, a number of transaction records (which will typically be unrelated and will have been created by different nodes) are bundled together by one of the nodes to form a block. For security purposes and prevention of fraud, the block may also include a proof-of-work requirement based on a property of the block. In an alternative, there may be a proof-of-stake requirement that needs to be performed in order to create a new group or trustless transactions. In the case of a proof-of-work, information satisfying the requirement is configured to be difficult to find, for example the solution to a complex mathematical problem, but easy to verify once found. In the case of proof-of-stake, there are no mining rewards, but instead participating nodes receive a share of the transaction rewards in exchange for validating transactions and creating new blocks. The transaction rewards correspond to the network resources supplied by the node also known as the node's wealth. Once the transactions are verified and a new block is created, the block is then propagated to other nodes in the network, which each checking and appending it to the end of the ledger. Thus, each node has a full copy of all transaction records that have been accepted in the distributed consensus network.

A transaction commit time between blocks is the delay imposed to enable nodes on the network to confirm the transaction and achieve consensus. A transaction commit time can be controlled when a blockchain is created. Depending on the amount of transactions processed on-chain and the number of participating nodes, the transaction commit time may range from a few seconds to a few hours. Short commit times are ideal for high through put transaction networks and for global trade applications involving high volume transfers of goods or verification of many products for compliance with a detailed list of regulations.

There are three types of blockchain networks: public blockchains, private blockchains, and consortium or federated blockchains. A public blockchain has no access restrictions. Anyone can participate in the execution of a consensus protocol by sending and validating their own transactions from a public node running on their local device. All transactions are valid and transparent but anonymous. Therefore, anyone on the private blockchain has the potential to disrupt current business models through disintermediation.

For applications with limited and highly specialized participants, such as GTM stakeholders, a concept of a public blockchain violates basic principles of security and restricted visibility.

A private blockchain is permissioned. Nobody can join it unless permission is granted by a network administrator. Participant and validator access is restricted. A private blockchain is beneficial to a company seeking to incorporate blockchain into their transaction-processing and record-keeping procedures without sacrificing autonomy and running the risk of exposing sensitive data to a public network.

There are three key advantages to the implicit nature of a private blockchain:
  Reduction in transaction costs and data redundancies.
  Simplified data-handling and more automated compliance mechanisms.
  Faster transaction execution time overall.

A federated blockchain provides a partially decentralized framework. It is permissioned but instead of a single organization controlling it, a number of companies might each operate a node a federated network. The administrators of a consortium chain restrict users' rights as they see fit and only allow a limited set of trusted nodes to execute a consensus protocol.

Regardless of the type of network participants, sophisticated blockchain architectures can be constructed for complex transaction workflows such as GTM applications. These advanced blockchain architectures include layers of sidechains and childchains that may or may not flow into a main blockchain network. A sidechain is a separate blockchain attached to the parent chain through the use of a two-way peg, such as MP, Chain-Relays, etc. the peg allows tokens or digital assets from one blockchain to be securely used in the sidechain and then, if needed, moved back to the original blockchain. In this blockchain architecture, the original blockchain is referred to as the main chain and all additional blockchains are referred to as sidechains. In the GTM blockchain concept, there is also a childchain. A childchain is a sidechain that is separated from the main GTM blockchain by another sidechain.

A sidechain is responsible for its own security. Since each sidechain is independent, if it is hacked or compromised, the damage will be contained within that chain and won't affect the main chain. Conversely, should the main chain become compromised, the sidechain can still operate.

For some especially complex transactions, automation may not be possible. The blockchain architecture described herein is designed by co-exist with certain off-chain transactions at require manual work. An off-chain transaction is the movement of value outside of the blockchain. An on-chain transaction—usually referred to as simply "a transaction"—modifies the blockchain and depends on the blockchain to determine its validity. Conversely, an off-chain transaction relies on other methods to record and validate the transaction, i.e., calculation of values that require access to a central database. By incorporating both off-chain and on-chain transactions, the GTM solutions described herein leverage blockchain based automation to promote efficient transactions without sacrificing the expertise and certainty that can only be provided by human involvement.

Automated transactions within the blockchain architecture are performed by smart contracts. A smart contract is a computer coded protocol intended to digitally facilitate, verify, or enforce the negotiation or performance of a contract. Some blockchain platforms do not have a strict concept of the smart contract, but they support the ability to execute custom code and therefore can perform similar functions. Once the contract is negotiated on the blockchain and signed by the private keys of the parties, the contract is visible to all participants, and it cannot be edited or deleted. The terms of the smart contract are directly written into lines of code and that is automatically executed by the blockchain upon the occurrence of a predefined event. Smart contracts allow the performance of credible transactions without third parties.

Smart contracts are deployed to a blockchain or other distributed data structure. To deploy a smart contract to a blockchain, contracts are first written in solidity code or another smart contract source code. Smart contract source code is then complied into Bytecode, a type of computer object code that can be interpreted by a blockchain virtual machine, and an application binary interface (ABI) that allows updates, modifications, transactions, and other communications to be pushed to the smart contract. The smart contract bytecode is then deployed to an on chain contract address so that one or more digital wallets can interact with the smart contract by sending identifying information, for example, wallet addresses, and collateral, for example, tokens to the smart contract address. Blockchain readers and other blockchain management programs can also view the smart contract and track third party activity with the contract by monitoring the corresponding contract address on the blockchain. Once deployed, client application access to smart contracts is controlled by privacy configurations for the contract address itself as well as the contract's corresponding ABI.

The design features discussed above ensure distributed blockchain systems are secure by design. The blockchain systems described herein further set and exemplify the full potential of distributed computing systems including high dependability and extreme levels of a fault-tolerance. The decentralized consensus, achieved with a blockchain concept is profoundly suitable for the recording of GTM events and processing transactions related to GTM activities because of the diverse number of participants in global trade. The rich variety of governments, importers, exporters, agents, customs officials, manufactures, wholesalers, distributors, retailers, and other stakeholders is ready-made for adaptation to a decentralized computing network. Moreover, the vast networks for cross border trade present in around the globe ensures wide distribution of the GTM blockchain network.

Hierarchical Blockchain Architecture

One possible blockchain architecture for implementing a GTM solution includes a main GTM subchain blockchain connected to a plurality of GTM sidechain blockchains. Each GTM sidechain links to a plurality of GTM childchain blockchains optimized for storing data and executing scripts relevant to a specific set of GTM operations (e.g., logistics, customs clearance, compliance, and free trade zone sidechains). By providing a secure, distributed data store for GTM information related to a specific geographic region, industry, type of goods, or large importer or exporter, GTM sidechain blockchains provide a readable record of a particular subset of GTM activities. GTM sidechain blockchains (i.e., sidechains) and childchain blockchains (i.e., childchains) may operate on blockchain networks that are distinct from the main GTM subchain blockchain, therefore, the sidechains and/or childchains may be customized, changed, or optimized without modifications to the GTM subchain blockchain or any other higher tiers of the blockchain architecture. These divisions between blockchain tiers allows low tier networks to be updated rapidly and customized to adjust for frequent changes to GTM operations within a particular region, industry, or importer (e.g., regulatory changes, new vendors, or increases in goods valuation).

Limiting the scope of these changes to GTM sidechains and/or childchains promotes network integrity at higher blockchain tiers by preventing a small group of GTM participants from changing GTM subchains or the ISC mainchain. Divisions between blockchain tiers also allow more resource intensive operations (e.g., duty calculations, GTM operation visualizations, and execution of smart contracts) to be performed on relatively centralized GTM childchains instead of more decentralized GTM subchains. Restricting resource intensive operations to lower tier blockchains reduces the redundancy of operations and makes the GTM blockchain system more scalable. Fewer computational resources are needed to run blockchain nodes participating in higher tier networks, therefore more participants can be involved. Cabining resource intensive operations to sidechains and childchains allows the parties that receive the benefit of the operations to bear the computational cost while also providing an open blockchain system that allows users to perform any operations they wish on chain.

GTM operation specific childchains may reconcile with a corresponding GTM sidechain to publish a subset of the information contained within a childchain block to the sidechain. This hierarchical architecture allows each GTM operation specific childchains to retain more detailed records of GTM activities and perform specific functions that require additional complexity and/or resources (e.g., executing smart contracts that incorporate off-chain operations or require reading blocks contained in another blockchain). In one non-limiting example, the results of off-chain operations (e.g., calculations and compliance verifications) populate the childchain. The resolved, GTM operation specific childchain-level content (e.g., executed smart contract transactions between parties, transaction history, and document and payment ledgers) is then aggregated and sent into a corresponding GTM sidechain that includes information on all GTM operations for a particular industry, region, importer, or type of goods. GTM sidechains for all industries, regions, importers, and goods are then reconciled on the main GTM subchain blockchain. In turn, the GTM blockchain may serve as sidechain to the ISC (International Supply Chain) blockchain that incorporates supply chain aspects other than GTM (e.g., supply of raw materials, tracking wholesale to retail distribution, and monitoring assembly and manufacturing operations). Due to the international nature of Global Trade Management, all blockchains must be able to support multiple currencies, multiple languages/cultures, and many time zones.

The hierarchical architecture limits distribution of data to the decision-involved parties or the supply chain participants that are directly responsible for collaboration between vendors. Parties seeking to perform complex operations that involve a lot of detailed data (e.g., visualizing supply chain processes) may also operate their own sidechain or childchain to reduce the amount of data stored on a subchain or mainchain. Calculations, verifications, and error corrections may be confined to the remote nodes participating in partitioned childchains, which do not consume resources of a main blockchain. The end result of operations performed on childchains, and sidechains would accumulate on subchains and main chains therefore the federated consensus of ISC and GTM blockchains is not disturbed by compartmentalization of information in this manner.

FIG. 1 illustrates one possible embodiment of a hierarchical blockchain architecture for GTM. The architecture has four or more tiers of blockchains including a supply-chain blockchain main chain 105, a GTM subchain 100, and a plurality of GTM sidechains 110 having GYM operation specific childchains 111-114. In one non-limiting example, each GTM sidechain 110 comprises four childchains corresponding to categories of GYM operations (e.g., a logistics childchain 111 for logistics and freight forwarding, trade regulation compliance childchain 112 for government and trade regulation compliance, a customs clearance childchain 113 for import and export customs clearance, and free trade zone (FTZ) and warehouse management childchain 114 for FTZ admissions, goods manipulations and customs bonded warehouse operations). GTM sidechains 110 may contain CTM information generated within a specific geographic region or industry. Alternatively, GTM sidechains 110 may be operated by a large importer or exporter preforming several or all GTM operations in house. The self-contained childchains 111-114 within each GTM sidechain 110 retain specific event milestones, documents, transaction histories, and other records needed to monitor activities performed in each category of GTM operations.

All of the blockchains exchange information between themselves and maintain a hierarchical structure. In one possible architecture, a plurality of GTM childchains 111-114 retain information specific to each class of GTM operations, for example, operations data, transaction records, audit trails, and event milestones to document completion of specific tasks. The event milestones recorded on each childchain are then combined into Global Trade Visibility/Business Partner Collaboration entries by a block aggregator 118 that collects, and compresses transaction data stored on each childchain 111-114. Blocks of GTV/BPC entries produced by the block aggregator 118 are recorded on the GTM subchain 100. One way hashes of GTV/BPC entries or other forms of aggregate GTM subchain data are then assembled into mainchain blocks 106 and then recorded on the international trade blockchain mainchain 105.

The hierarchical architecture improves the scalability of the GTM system by reducing the amount of data stored on the upper tier GTM subchain 100 and the international trade mainchain 105. Additionally, by cabining most of the data processing load to a plurality of self-contained childchains and/or complementary off chain applications, the hierarchical blockchain architecture reduces the amount of redundant calculations performed by parties participating in separate classes of GTM operations. Partitioning operations of different GTM childchains and applications also makes the system easier to update and maintain. Limiting the complexity of the hierarchical architecture is also important because each blockchain must be connected by one or more two-way communication pegs or chain relays in order to support cross chain transactions. Adding additional communication infrastructure needed to connect more blockchain tiers further strains the resources of blockchain networks included in the system and prohibits implementing overly complex architecture at scale.

In one possible example, each GTM childchain 111-114 is comprised of two parts. A private permissioned blockchain that includes multiple nodes 115 run by different participants in the class of GTM operations that corresponds to a particular GTM childchain 111-114. Each node 115 includes a blockchain client that allows users to validate transactions and blocks, create and manage blockchain accounts, send and receive transactions to and from blockchain accounts, deploy smart contracts and other self-executing code to the blockchain, and mine transactions blocks. Each Node 115 further includes a blockchain virtual machine that enables smart contracts to run algorithmic calculations and a distributed storage platform and content distribution service that enables reference information needed for smart contract execution to be stored off-chain. Nodes 115 may also include a messaging service for communications with other connected nodes and an oracle for enabling smart contracts to interact with real-world or off-chain events. By executing smart contracts 116 on the blockchain virtual machine and maintaining a common record of transaction data on the distributed storage platform, every node 115 shares access to the same data and executes contracts in exactly the same manner.

In addition to the components of the private permissioned blockchain, nodes 115 also include off-chain GTM software modules. Each module includes specialized program instructions specific to each category of GTM functions. The off-chain GTM modules contain a local store of global compliance data that informs how the GTM function must be performed in a specific jurisdiction or for a specific type of product. GTM modules further include instructions for performing calculations and other verification of compliance functions locally and off-chain. The results of the calculations and verification functions are recorded on the relevant GTM childchain and disseminated to the other nodes 115 in the network for monitoring and tracing. The two-tiered, hybrid on-chain and off-chain architecture for each childchain eliminates redundancy of information, for example, repeat calculations on multiple nodes 115, allows the GTM system to efficiently maintain and update GTM module specific computer code, and provides efficient off-chain storage of global content in a single location. Examples of global content stored in GTM modules include Harmonized Tariff Schedules (HS/HTS), Free Trade Agreements (FTAs), and Restricted/Denied Parties Lists (RPL/DPL).

Example GTM Childchain Block Implementations

Figure 2:
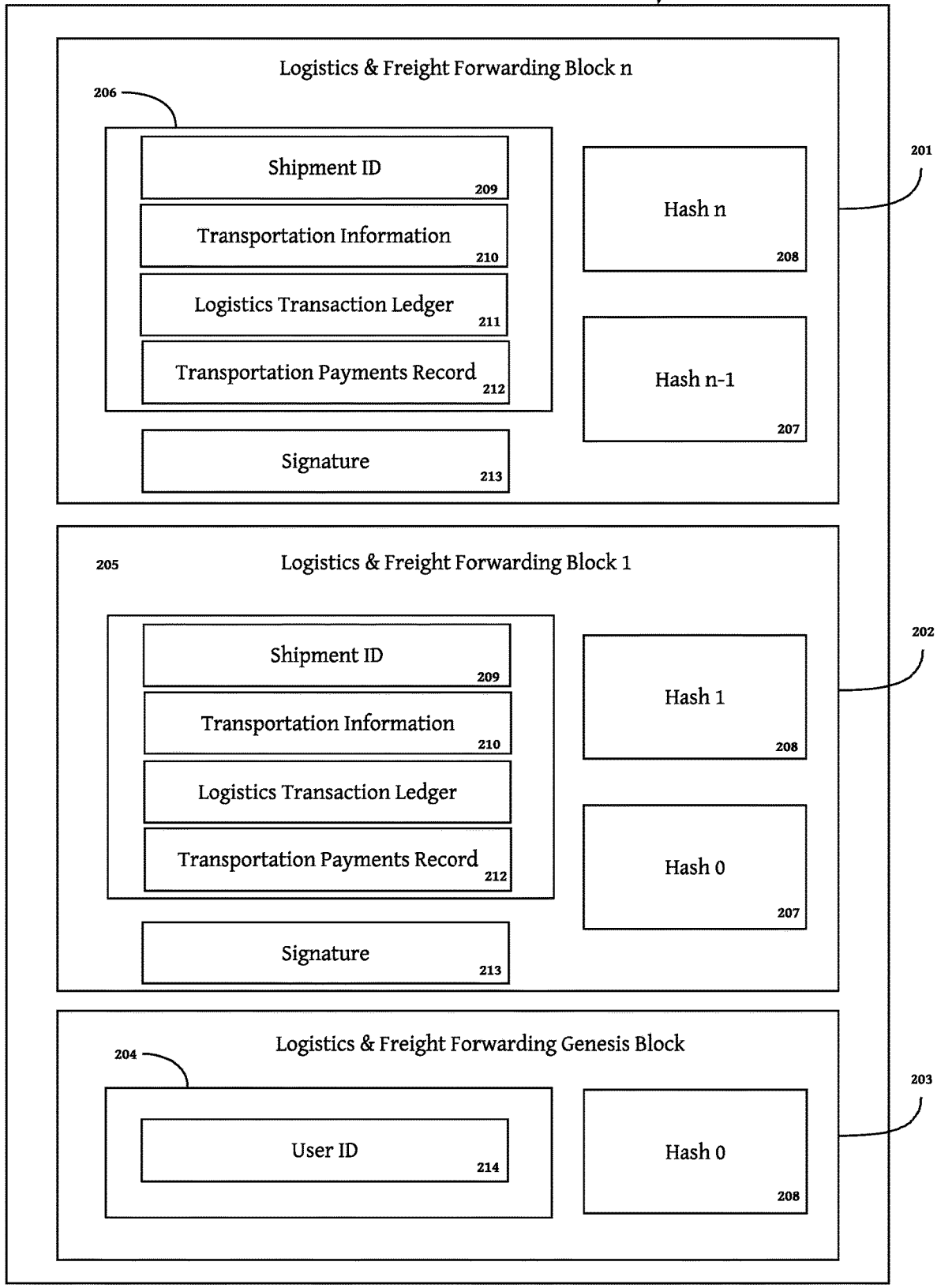
FIG. 2 is a block diagram of a logistics and freight forwarding childchain blockchain including n blocks and a genesis block.

FIG. 2 is a block diagram of a childchain blockchain for logistics and freight forwarding GTM operations. GTM freight forwarding is a nuanced process that includes tracking inland transportation, preparation of shipping and export documents, warehousing, booking cargo space, negotiating freight charges, freight consolidation, cargo insurance, and filing of insurance claims. Export freight forwarders usually ship under their own bills of lading or air waybills (called a house bill of lading or house air waybill) and their agents at the destination (import freight forwarders) provide document delivery, deconsolidation, and freight collection services. Most logistics functions require manual interventions executed off-chain therefore freight forwarding blockchain childchains must have an oracle that provides access to off-chain events and data.

The logistics and freight forwarding childchain can facilitate a variety of transactions across multiple GTM processes. Carriers of products going into and out of FTZs or customs bonded warehouses (CBWs) can record pickup and drop off transportation information on the logistics and freight forwarding childchain to create an immutable record of shipment movement and handling. Transportation information that may be recorded on-chain includes shipping party, customer, pickup time, mode of transportation, costs, expected delivery date and other information relating to product transportation. Logistics and freight forwarding childchains used by parties moving products out of FTZs and Cl3Ws may have one or more smart contracts deployed on-chain to facilitate cross chain interactions. One example verification smart contract reads the compliance and customs childchains to verify compliance with customs and border protection regulations in the transfer of goods to the freight forwarder. These smart contracts may require one or more digital signatures to verify completion of an export compliance process. Digital signatures may be published to logistics and freight forwarding smart contracts and/or blocks to authenticate completion of a compliance process performed on-chain or off-chain using a computer system (e.g., a GTM software module), manual process, or some combination. Export compliance processes that may be verified using a smart contract include:

known export shipper verification;
consolidation and de-consolidation of export goods;
calculation of multi-leg landed costs; and
export control classification number (ECCN) determination.

In one implementation, verification smart contracts authenticate the carrier of a shipment of goods is on an international known shipper list through one or more cross chain interactions. The verification smart contract running on the logistics and freight forwarding childchain may interface with the trade regulation compliance childchain to lookup a carrier in a block containing known shipper database search results for the carrier. To complete the verification process, database screening results received from the trade regulation compliance childchain may be published to the verification smart contract directly or to a logistics and freight forwarding block read by the smart contract. The verification smart contract may include additional functions to facilitate carrier interactions, for example distribute payment from a customer or escrow wallet to a carrier account or wallet. The verification smart contract may also send retrieved database screening results to another blockchain at any tier of the hierarchical blockchain architecture (e.g., a GTM subchain or customs clearance childchain).

Parties may also use logistics and freight forwarding childchains to help move products into FTZs and CBWs. These childchains may have one or more import compliance or agency service smart contracts deployed on-chain to make the data verification process for getting products into FTZs and CBVs more efficient. The FTZ and CM import smart contracts may require one or more digital signatures to verify completion of an import compliance process performed on-chain or off-chain using a computer system (e.g., a GTM software module), manual process or some combination. Import compliance processes that may be verified using a smart contract include:

consolidation and de-consolidation of import goods;
known import shipper verification; and
calculation of landed costs.

Verification smart contracts implemented on the logistics and freight forwarding childchains may also be used during the export and import clearance process to authenticate or store locations of transportation information, for example, a bill of landing for ocean shipments or an air way bill for air shipments. Container loading data may also be authenticated on-chain or accessed through an address stored on a logistics and freight forwarding childchain. Examples of container loading data that may interface with a childchain component include importer security filings, additional carrier requirements applied to arriving import cargo, and ocean export manifest information. Pro-bills and proof of delivery (POD) receipts may also be authenticated or stored on-chain to facilitate post clearance distribution of imported goods.

Auction smart contracts may also be deployed on a logistics and freight forwarding childchain. In one implementation, auction smart contracts facilitate purchasing and selling import and/or export container space. Shipments of goods are consolidated into containers for ocean and air shipping. Each container may contain many different shipments of goods and each space within the container may have a different market value (e.g., container space close to the door of the container may be more valuable because it will be unloaded faster). Different containers (e.g., refrigerated containers or express delivery containers) may also have different market values for the space inside. To facilitate selling and purchasing containers space an auction smart contract may interface with an on chain or off-chain auction application that may run a continuous live auction for container space. The auction smart contract may read the auction application and record auction results on-chain. Auction smart contract may also facilitate exchange of funds for purchased containers space between importers/exporters and freight forwarders. The auction smart contract may also include a verify container function that reads another blockchain (e.g., a trade regulation compliance childchain) to determine the party selling the container space has passed all required security clearances and is on the list of approved freight forwarders.

Authenticity of logistics data and logistics reports generated at any stage of the freight forwarding process may be audited and verified on-chain by passing one or more digital signatures to a smart contract deployed on the logistics and freight forwarding childchain. The location of compliance documents in distributed or local storage may also be recorded on-chain to inject additional transparency into the ownership and possession of important information. To enable more efficient retrieval of compliance documents, the logistics and freight forwarding childchain may interface with a distributed storage platform or off chain computer system (e.g., GTM software module) having local storage resources.

In one possible implementation the logistics and freight forwarding childchain 111 includes n blocks 201, 202 and a genesis block 203. In one implementation, then blocks 201, 202 have at least four elements: a content section (e.g., 204-206) that stores primary and ancillary data relevant to logistics and freight forwarding operations; a digital signature 212 that allows users to verify blocks and block entries; the cryptographic hash (e.g., 207) of the previous block (the genesis block will not have a previous block); and the cryptographic hash (e.g., 208) of the current block. In one possible example logistics and freight forwarding childchain blockchain block 201, the content section includes a shipment ID 209, transportation information 210, logistics transaction ledger 211, a transportation payments record 212 and a digital signature 213.

The shipment ID 209 unambiguously identifies each shipment of goods in the logistics and freight forwarding GTM process pipeline so events, payments, and other information related to the shipment can be tracked and aggregated. The shipments may be consolidated shipments including, for example, all goods shipped in one container, all goods purchased by a particular customer, all goods transported by a common carrier, or all goods of one type. Alternatively, shipments may be deconsolidated shipments including, for example, all goods of a particular type purchased by a customer, or all goods transported by a carrier going to a specific location. The freight forwarder or carrier of goods creates and controls the shipment ID.

Transportation information 210 describes the shipment of goods identified by the shipment ID 209. Transportation information 210 may include carriers, shipment location information, container information, shipping restrictions, transportation costs, consolidation and de-consolidation information, commercial documents (e.g., licenses, permits, screening completion verification, arrival notices, invoices, etc.) or database locations and/or endpoints for accessing commercial documents, and other information that relates to transporting shipments of goods. The format of the transportation information may be a file written in either a standardized file encoding language such as eXtensibel Markup Language (XML), JavaScript Object Notation (JSON), or Hypter Text Markup Language (HTML), or any proprietary format. Files containing transportation information may be organized into a data structure that provides access to the text included in the files, for example, an object database indexed using a full text search engine. Alternatively, file names, storage addresses, or data fields within the files may be arranged as a list in a relational database or distributed data service.

All non-financial transactions related to transporting goods including transfer of custody, consignment arrangements, pickups, and drop-offs, may be included in the logistics transaction ledger 211. In one non-limiting example, to avoid processing transportation information 210 on a blockchain node, entries in the logistics transaction ledger 211 may be generated from transportation information 210 by a logistics application running on a client or network device. The logistics transaction ledger 211 may then be published to the logistics and freight forwarding childchain with new entries included in subsequent blocks added to the chain. All financial transactions related to transporting goods including payments to carriers and import and export document filing, and preparation fees may be included in the transportation payments record 212. The logistics transaction ledger 211 and the transportation payments record 212 may be stored in a data structure listing a list of transactions, parties, transaction data, and other transaction metadata.

Optionally, logistics and freight forwarding childchain blockchain blocks include a digital signature field 213. GTM participants running logistics and freight forwarding childchain nodes or operating logistics and freight forwarding childchain accounts or wallets may use the digital signature field to verify content included in the content section. Some transactions in the logistics transaction ledger 211, the transportation payment record 212, and/or fields included in transportation information 210 may require a signature 213 by a carrier, customer, or blockchain network administrator in order to be included in a new block or updated in a subsequent block. Additionally, smart contracts deployed on the logistics and freight forwarding childchain blockchain may be conditioned to execute only if one or more signatures 213 appear in a logistics and freight forwarding block 201-202.

In the example shown in FIG. 2, the information block 204 of the genesis block 203 holds at least the user ID 214. The user ID 214 may be anonymous, as the GTM childchain blockchain 200 may be public. The User ID 214 is published in the genesis block and is not confidential. The genesis block 203 also includes a hash 208 of its information block 204. The subsequent block (e.g., logistics and freight forwarding block 1 202) also includes a hash 208 of the current block and a hash 207 of the preceding block.

In one implementation the logistics and freight forwarding childchain blockchain is unique to an individual identified by the user ID 214. This individual may be a consumer or provider of GTM services or a third-party government agency or GTM auditor. In another implementation, the logistics and freight forwarding childchain blockchain holds the transportation information and logistics transaction records for all users of a given ecosystem, for example, all transportation service consumers, carriers, regulatory agencies, and auditors operating in an industry or geographic location. In this case, the block information would also contain the user ID 214 and the genesis block 203 would be different in that it would not be dedicated to a specific user ID. Instead, the genesis block 203 might designate a common GTM ecosystem ID or industry federation ID.

Figure 3A:
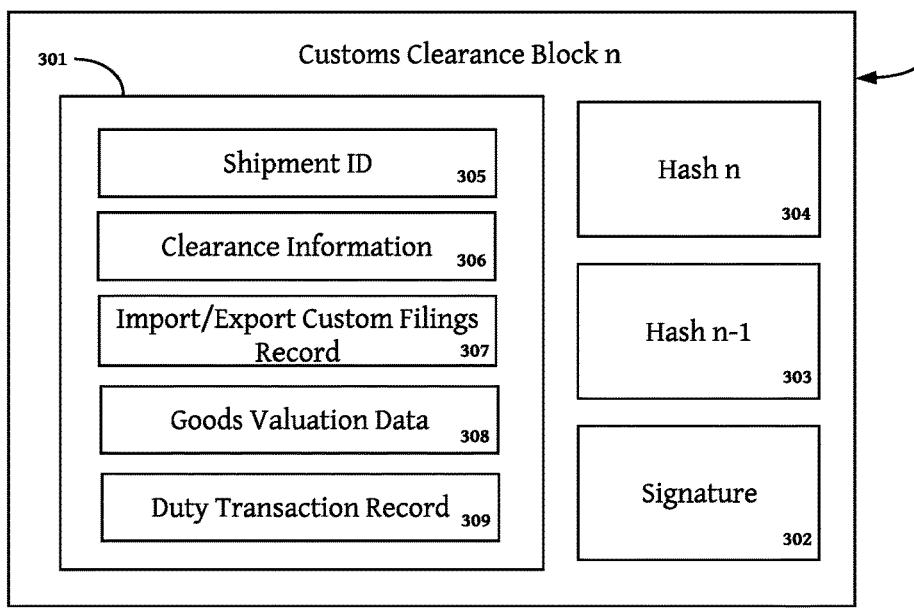
FIGS. 3a through 3c show blocks produced by one implementation of compliance, customs clearance, and free trade zone childchain blockchains.
Figure 3B:
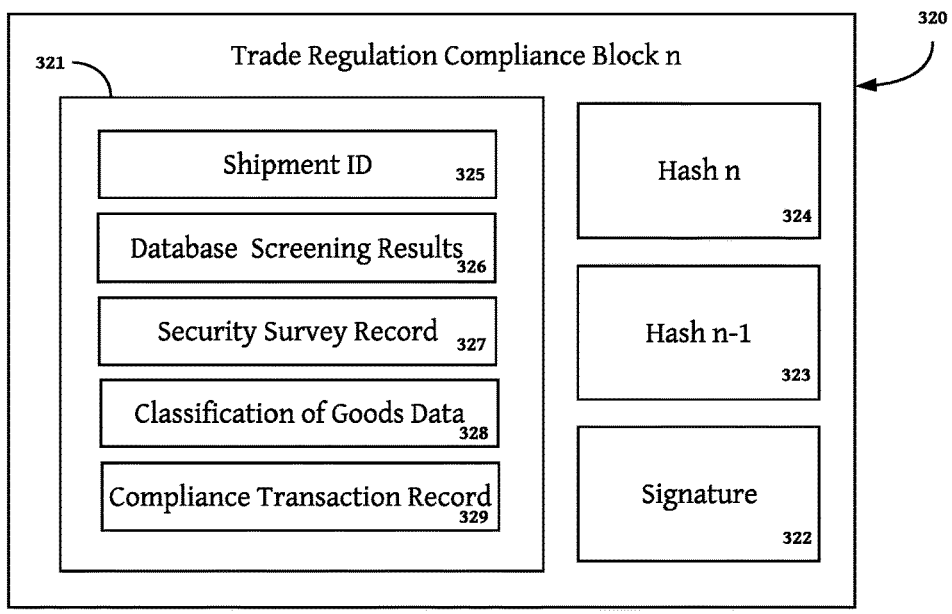
Figure 3C:
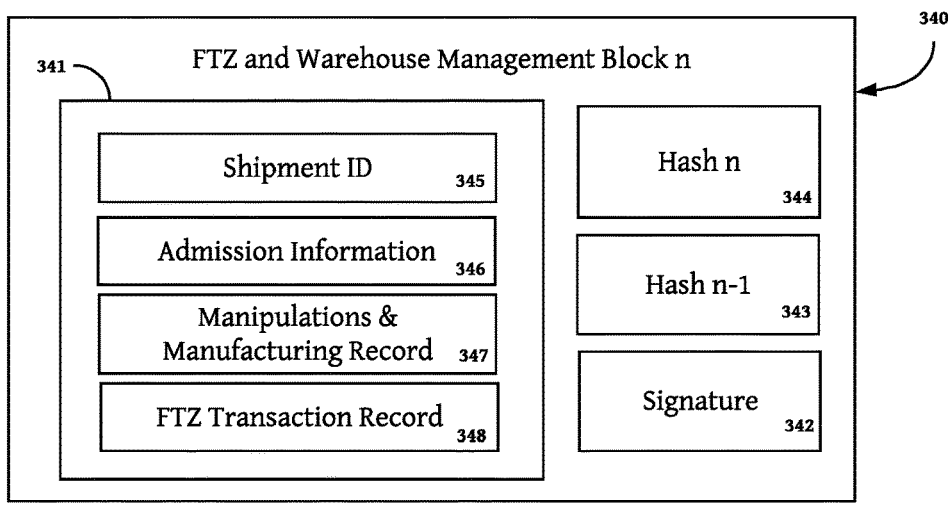

FIGS. 3*a*-3*c* are block diagrams of sample blocks of other GTM childchain blockchains included in the hierarchical blockchain architecture. FIG. 3*a* shows a sample customs clearance childchain block 300. A sample trade regulation compliance childchain block 320 is shown in FIG. 3*b* and FIG. 3*c* illustrates one example FTZ and warehouse management childchain block 340. Similar to the logistics and freight forwarding blockchain, each of the childchains includes a genesis block (not shown) and n blocks 300, 320, 340. Each n block 300, 320, 340 comprises at least four components: a content section (301, 321, 341) that stores information relevant to a particular GTM operation; a digital signature (302, 322, 342) that allows users to verify blocks and block entries; the cryptographic hash (303, 323, 343) of the previous block (the genesis block will not have a previous block); and the cryptographic hash (304, 324, 344) of the current block.

Each childchain is specialized to augment a particular set of GTM operations, therefore the content section (301, 321, 341) for each childchain block is different. Different smart contracts may also be deployed on each childchain to facilitate specific GTM processes. Smart contracts may interface with blockchains at any level of the hierarchical blockchain architecture and/or off chain computer systems, databases, or accounts.

Customs Clearance Childchain

Customs clearance is the documented permission granted by a national customs authority for products to pass in to—or out of—a jurisdiction. It allows for import goods to enter the country and exported goods to leave the country. Customs clearance is a complex process that includes preparation and submission of documentation and information required to facilitate export and import of cargo, valuation of goods, customs clearance assessments, levying duties, payment of levied duties, withdraw and refund of any overpayment of duty, and delivery of cargo and transportation documents from customs after clearance.

GTM customs clearance functions (e.g., duty calculations and valuation of goods) involve time-consuming calculations and sophisticated verification protocols that require resource intensive database queries and obligatory manual interventions. The import and export customs clearance childchain must incorporate execution of these functions off-chain using a GTM module, manual process, or some combination. To reconcile the immutable record stored on the childchain with these off chain processes, the result of off-chain recorded on the clearance childchain.

The import and export customs clearance childchain can be leveraged to facilitate compliance with local customs regulations and free trade agreements (FTAs). As part of the FTA management cycle, one or more import/export customs compliance smart contracts may be deployed on the customs clearance childchain to verify FTA eligibility or authenticate products that have previously been declared eligible. In one implementation the customs compliance smart contract reads FTA compliance information for a shipment ID from the FTZ and CBW childchain and clears shipments for entry into a FTZ after receiving a digital signature from a customs agent. By passing one or more digital signatures to an import/export customs compliance smart contract deployed on-chain, customs agents or other authenticating parties can expediently provide immutable evidence of FTA eligibly and compliance for suppliers and clients. Storage address or other endpoints for accessing certificates of origin for supplier and client goods that are FTA eligible may also be recorded on-chain to reduce fraud and make compliance verification more efficient.

Milestone events related to moving products in to—or out of—FTZs and CB\Vs may be recorded on the custom clearance childchain to facilitate product tracking and fraud monitoring. Milestone events for products moving out of or into FTZs include goods valuation, authentication of shipment country of origin, export product designation, inter zone product designation, and clearance through customs and border protection. Milestone events for moving products out of—in to—CBWs include product classification, goods valuation, verification of product manipulations, and clearance through customs and border protection.

As part of the export clearance process, the import and export customs clearance childchain may verify and provide storage endpoints for documents reciting geo-specific determinations related to duty and taxes. The import and export customs clearance childchain may similarity facilitate verification of customs documents during the import customs clearance process. In addition to authenticating and recording customs clearance documents, goods valuation calculations and duty payments may be recorded on the customs clearance childchain. A duty management smart contract may be deployed on-chain to record duty and tax information including customs clearance documentation of off chain calculations of duties and taxes.

In one implementation, the duty management smart contract interfaces with an off chain computer system running a duty calculation application to determine the valuation of goods included in a shipment ID and the shipment's required duty amount. Upon receiving a digital signature confirming the duty calculations from the importing/exporting party, the duty management smart contract moves the appropriate amount of money from the importer/exporters account to an escrow wallet. A request for authorization is then sent by the duty management smart contract to a customs agent computer system. Upon receiving a digital signature from the customs agent authorizing the duty payment, the duty management smart contract released the duty payment from the escrow wallet to the customs account and records the duty payment transaction in the duty transaction record portion of an import and export customs clearance childchain block. Completion of national reconciliation and national drawback processes may be similarly completed by smart contract and recorded on the import and export customs clearance childchain during the post customs clearance process.

To facilitate compliance with local import and export laws, the import and export customs clearance childchains and the smart contracts deployed on chain may incorporate customs clearance regulations specific to a jurisdiction. Customs clearance processes that may be verified using a smart contract deployed on the customs clearance childchain include:

determination of the most favorable duty treatments;
completion of electronic customs reporting;
generation and transmission of reports to national customs agencies;
creation and approval of in-bond deliveries;
transportation of in-bond goods;
classification of goods;
submission of importer security filing (ISF documents);
valuation of goods;
calculation of additional taxes and duties, for example, antidumping (ADD) and countervailing (CVD) duties;
drawback and refund of overpaid duties.

In one possible implementation, the import and export customs clearance childchain block 300 includes a shipment ID 305, clearance information 306, an import and export filing record 307, goods valuation data 308, and a duty transaction record 309. The shipment ID 305 unambiguously identifies shipments of goods involved in customs clearance GTM operations. Clearance information includes shipment specific information relevant to import and export customs clearance operations (e.g., shipment valuation, importing party, exporting party, carrier, container location, country of origin, destination location, duty rates, approved customs vendors, customs agent, duty amount, import date, and export date). Goods valuation data 308 includes calculated shipment of goods valuations and evidence supporting and documenting valuation of goods determinations (e.g., type of goods, quality of goods, manufacturing processes used to make goods, materials included in goods, retail or wholesale nature of goods, and market for selling goods).

The Import and export filings record 307 lists a listing of all import and export documents filed for a particular shipment ID 305 during the customs clearance process. The import/export record may also include information relevant to each filed import and export document (e.g., document preparing, filing party, filing data and time, filing location, document review status, and document review party). The duty transaction record 309 lists a listing of all duty transactions made for a particular shipment (e.g., duty payments, duty drawbacks, and duty refunds). Information relevant to each duty transaction (e.g., paying party, payment receiving party, payment method, paying wallet ID, receiving wallet ID, duty management smart contract ID (if payment completed by smart contract) payment date, payment time, payment approval status, and payment amount relative to expected payment amount based on an anticipated valuation). Content included in the customs clearance childchain content section 301 may be organized into files stored in a data structure that exposes the native text of the files or lists the file names and locations.

Government and Trade Compliance Childchain

Transactions at all stages of GTM must comply with one or more layers of government regulation specific to the jurisdiction where the transaction takes place. To account for national differences is global trade regulations, the government and trade compliance childchain is powered by an off chain database of global content sourced from national governmental agencies and trade-related entities. This global content database changes daily and access to historical data is essential for functional compliance operations. To facilitate international GTM regulatory compliance processes, the same compliance information can be stored in multiple languages and displayed in a native cultural format (e.g., modify the language and display of compliance data to have the language, date layouts, and nation specific codes or numbers of the location where the content is accessed). The volume of global content is too big for scalable replication on blockchain nodes therefore it must be stored off-chain in a distributed storage system, on a computer system using local storage resources (e.g., a GTM module in connection with a hard drive and processor with available main memory), or some combination.

Instead of storing global compliance content, the government and trade compliance childchain stores transactions records, database screening results, classification of goods data, milestone events, and documentation access endpoints that provide an immutable record of the occurrence and outcome of every trade compliance operation. Records of compliance activities that depend on frequently changing and highly specific regulations stored on the trade compliance childchain ensure the overall GTM blockchain system is scalable and easy to maintain. Every modification, addition, or deletion of a geo-specific compliance regulation necessitates modifications to the trade compliance childchain and the off chain GTM compliance database. Pushing changes to a vast network of distributed nodes is time consuming and resource intensive. Additionally, errors caused by program updates pushed to GTM compliance modules that facilitate compliance with new regulations can have severe negative impacts on all GTM blockchains on the network. A hierarchical blockchain architecture that performs resource intensive compliance functions (e.g., database screening operations, classification of goods determinations, and compliance content database updates) off chain and reconciles the results of these functions on chain (e.g., on a trade compliance childchain of GTM subchain) eliminates scalability, inflexibility and distributed control problems of monolithic, single tier blockchain systems.

One or more smart contracts may be deployed on the government and trade compliance childchain to verify classification results, authenticate database screening results, distribute screening results to other GTM systems, authenticate documents, and automate portions or entire export compliance related transactions. In particular, security clearance, export compliance, goods classification, and agency services smart contracts are used to facilitate export compliance operations including:

security assessments, for example, Customs—Trade Partnership Against Terrorism (C-TPAT), Authorised Economic Operator (AEO), Partners in Protection (PIP), Business Anti-Smuggling Coalition (BASC), New Scheme of Certified Companies (NEEC), Secure Trade Partnership (STP), Golden List Program;

screening against national and international lists of restricted or denied parties;

determination of county of origin;

screening against lists of prohibited export countries;

determination of export restrictions;

possession of export licenses;

required labeling for specific product types; and possession of required export documents.

Smart contracts deployed on the government and trade compliance childchain can also be leveraged to verify classification results, authenticate database screening results, distribute screening results to other GTM systems, authenticate documents automate portions or entire import compliance related transactions. In particular, security clearance, export compliance, goods classification, and agency services smart contracts are used to facilitate import compliance operations including:

security assessments, for example, Customs—Trade Partnership Against Terrorism (C-TPAT), Authorised Economic Operator (AEO), Partners in Protection (PIP), Business Anti-Smuggling Coalition (BASC), New Scheme of Certified Companies (NEEC), Secure Trade Partnership (STP), Golden List Program;

screening against national and international lists of restricted or denied parties;

determination of county of origin;

determination of import restrictions;

existence of favorable trade agreements;

possession of import permits;

required labeling for specific product types;

possession of required import documents; and determination of import quotas.

In one implementation, the government and trade regulation compliance childchain block 320 includes a shipment ID 325, database screening results 326, security survey record 327, classification of goods data 328, and a compliance transaction record 329. The shipment ID 325 unambiguously identifies shipments of goods processed in trade regulation compliance GTM operations. Results of security and private database screenings for all parties associated with shipments of goods (e.g., purchasing parties, vendors, and auditors) are included in the database screening results 326. Every party involved in providing services (e.g., moving, manufacturing, or storing) or purchasing goods must be screened, therefore database screening results 326 must be at every stage of the GTM pipeline where a new party is interacting with a shipment of goods.

Security survey record 327 stores security survey forms (e.g., C-TPAT for US imports/exports; AEO for Europe, and PIP for Canada) that must be submitted during GTM compliance operations. Related information, for example, survey completing party, survey verifying party, survey title, survey approval statues, survey submission date, and survey submission time may also be included in a security survey record 327. Classification of goods data 328 includes information used to make classification of goods decisions (e.g., type of goods, industry goods are used in, materials used in goods, value of goods, and processes used to manufacture goods) during GTM compliance operations. Information related to classification of goods decisions (e.g., party making classification, classification decision time, and classification status) may also be stored in classification of goods data 328. The compliance transaction record 329 lists a listing of all compliance events that occur across all GTM process (e.g., security surveys, database screenings, duty payments, goods clearance events, goods transfer, and goods classification events). Content included in the trade compliance childchain content section 321 may be organized into files stored in a data structure that exposes the native text of the files or lists the file names and locations.

FTZ and BWM Childchain

A Foreign Free-Trade Zone (FTZ) is a specific class of special economic zone. It is a geographic area where goods may be landed, stored, handled, manufactured, or reconfigured, and re-exported under specific customs regulation and generally not subject to customs duty. A customs bonded warehouse (CBW) is a secured area in which dutiable goods can be stored, manipulated, and further manufactured without payment of a duty. Goods can be withdrawn from a CBW of FTZ for consumption domestically after payment of duty.

To receive the benefits of performing operations in a FTZ, goods moving in to—and out of—bonded warehouses must successfully complete an import and export customs clearance processes. FTZ contracts generated during the customs clearance process involve time-consuming calculations therefore can be difficult to automate. The FTZ and bonded warehouse management system (WMS) childchain, however, provides increased levels of automation for warehouse inventory management and FTZ clearance processes by limiting the number of nodes in the childchain system. This framework providing few required permissioned nodes to achieve consensus for approving movement of goods and navigating clearance processes limits information redundancy on the childchain system. By restricting the number of nodes needed for consensus, execution of FTZ functions can be done on-chain without or with limited computerized off-chain operations. By interfacing with a distributed data storage platform or off-chain storage solution, the FTZ childchain can scale to a larger, more distributed network without significantly increasing processing resources or maintenance costs.

One or more smart contracts may also be deployed on the FTZ and bonded \VMS childchain to facilitate FTZ clearance processes and movement of products into and out of bonded warehouses. Specific operations that may be verified or recorded on-chain include:
  inter-zone transport of goods;
  manipulation and manufacturing permits, for example,
    US customs Form 216 for application for foreign trade zone admission and/or status designation;
  management of warehouse lots;
  generating FTZ reports; and
  recording and authenticating FTZ data.

In one implementation, the FTZ and warehouse management childchain block 340 includes a shipment ID 345, FTZ and/or CM admission information 346, product manipulations and manufacturing record 347, and an FTZ transaction record 348. The shipment ID 345 unambiguously identifies shipments of goods processed in FTZ and warehouse management GTM operations. Admission information 346 includes required documents (e.g., FTZ/CB\ V admissions documents, goods ownership documents, compliance documents, and country of origin documents) for bringing goods into a bonded warehouse within a free trade zone. Document metadata (e.g., parties, type of goods, and date of entry) may also be included in the admission information 346.

The product manipulations and manufacturing record 347 provides a listing of all goods manipulations (e.g., manufacture, assembly, storage, cleaning, repurposing and inspection) performed within a free trade zone. Vendors performing the manipulations recalculate the cost of the manipulations, the change in value of the goods as a result of the manipulations, date of the manipulations, and other information relevant to the manipulations may also be included in the product manipulations and manufacturing record 347. The FTZ transaction record 348 lists a listing of all entries of goods into and out of an FTZ. Movement of goods within an FTZ and movement of goods from one FTZ or CM to another may also be included in the FTZ transaction record 348. Data related to each FTZ transaction (e.g., parties, cost of transportation if change in location of goods, duration of stay in one warehouse or FTZ, cost of goods if ownership is transferred, party verifying compliance of FTZ regulations related to the FTZ transaction, and date FTZ transaction occurred) may also be included in the FTZ transaction record 348. Content included in the FTZ and warehouse management childchain content section 341 may be organized into files stored in a data structure that exposes the native text of the files or lists the file names and locations.

In one example GTM childchain implementation, the childchain blockchain uses the following information and format: the user ID is a 2048-bit number that is provided by the registration authority (e.g., carrier for logistics and freight forwarding childchain, importer/exporter for customs clearance and compliance childchains, CBW/FTZ operator for FTZ childchain) when the user enrolls and creates a genesis block; the shipment ID uses the an unambiguous alpha numeric identifier for the shipment of goods identification; the childchain block content is a data structure providing access to the native text of the content files or listing the file names and storage locations; and all the hashes are SHA-512 coded in base64. For childchain blocks, the signature is an RSA 2048 (Rivest, Shamir, and Adelmana; a public-key cryptosystem) of four block components user ID, shipment ID, verified content, and the hash of the previous block (e.g., block$_{n-1}$). The registration authority and/or childchain user generates the signature using its root signing private key. For the genesis block, the signature is an RSA 2048 of the field user ID. The hash of a block encompasses the content section of the block and the hash of the previous block. The hash of the genesis block encompasses only the content section.

GTM Cross Chain Interactions

There are four major GTM service providers—compliance specialists, freight forwarders, customhouse brokers, and FTZ operators. Additional GTM participants include importers and exporters who consume GTM services. Many exporters and importers exercise full control of GTM-related functions in-house because they are ultimately responsible for all compliance decisions. By performing many GTM operations in house, these large importers and exporters can effectively act as their own provider for one or more of the four major GTM service classes. The tiered blockchain solution described herein is extremely flexible and fully configurable to the specific needs of any GTM participant for any GTM process or set of processes. One possible arrangement of GTM childchains for each of the four major GTM service providers includes:

Compliance Specialists—host only a Governmental and Trade Compliance childchain and outsource all other childchains.
   Freight Forwarders—host only Logistics and Freight Forwarding and Governmental and Trade Compliance childchains and outsource all other childchains.
   Customhouse Brokers—host only Import and Export Customs Clearance and Governmental and Trade Compliance childchains and outsource all other childchains.
   FTZ operators—host three of four childchains: FTZ and Bonded\VMS, Import and Export Customs Clearance, and Governmental and Trade Compliance childchains and outsource the Freight Forwarding childchain.

Due to the tiered architecture of the blockchain system, parties managing the childchain nodes do not affect the execution of GTM smart contracts. The parties participating in the transaction verified, initialized, or completed by the smart contract (e.g., purchasing importers, transporting freight forwarders, or approving customs agents) control smart contract execution by publishing data to the smart contract or one or more blockchain systems (e.g., childchains or GTM subchain) read by the smart contract. Other nodes participating in the network collectively control higher order functions of the network, for example, network updates, consensus for block validation, and the network's permissioned state (e.g., public, permissioned, or private). For permissioned networks, the size and composition of the federation voting on the network depends on the network participants, as does the consensus mechanism used to derive network consensus.

Figure 4:
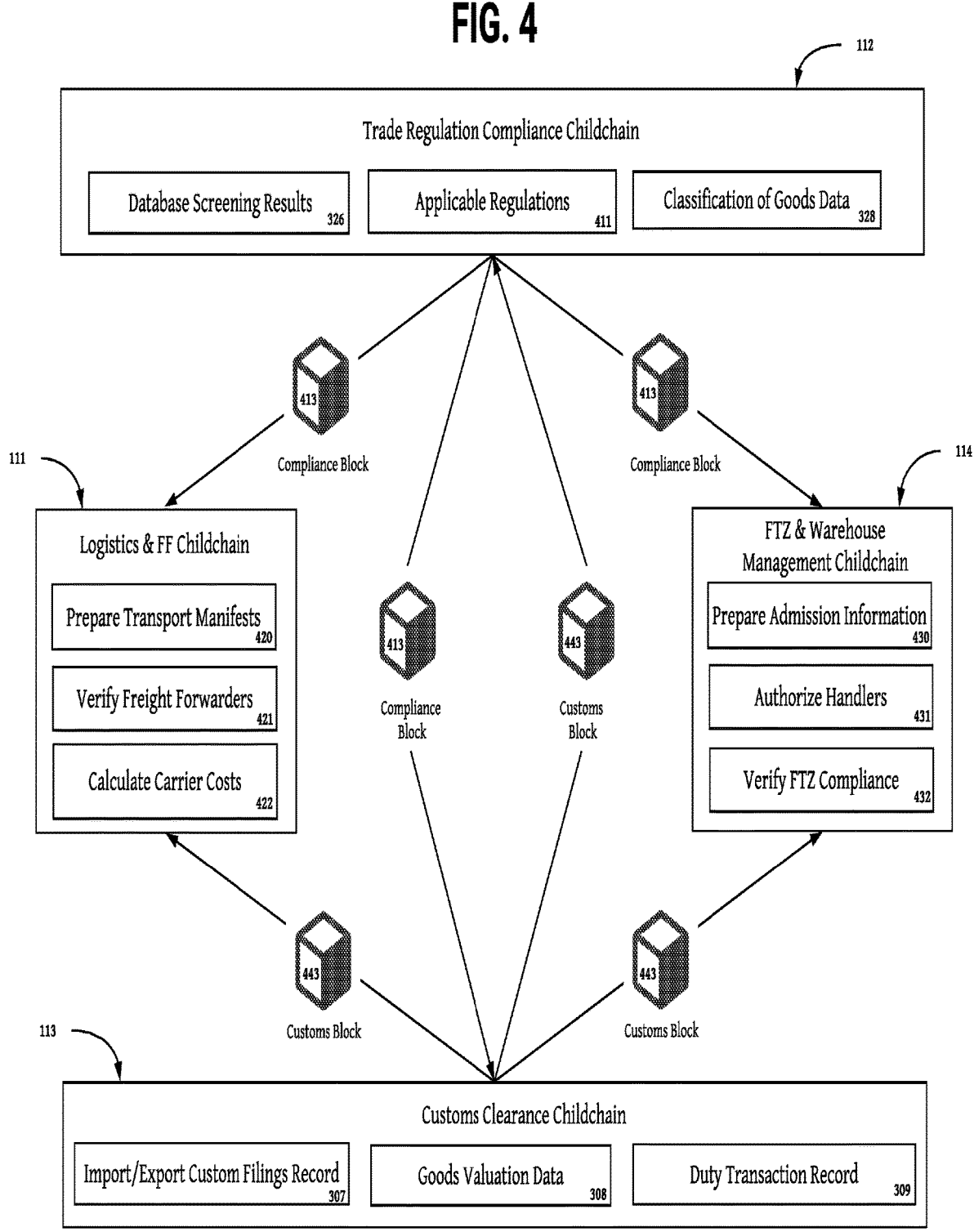
FIG. 4 displays cross chain interactions between a plurality of childchains, the GTM subchain, and the international trade (ITC) main chain.

One possible implementation of a linked GTM childchain ecosystem providing cross chain interactions within a hierarchical blockchain architecture is shown in FIG. 4. The linked GTM childchain ecosystem includes four distinct categories of GTM blockchain childchains. Logistics and freight forwarding childchain blockchains 401 help shippers and consignees facilitate storage and shipping of merchandise. Import export custom clearance childchain blockchains 403 record and authenticate documented permission for goods and materials to pass into a country. Governmental and trade compliance childchain blockchains 400 facilitate compliance with trade laws enforced by national government agencies. FTZ and warehouse management childchain blockchains 402 facilitate product movements and manipulations with and free trade zone.

The hierarchical blockchain architecture described herein relies on cross chain interactions between childchains and between different blockchain tiers within the architecture. To deliver its full functionality, childchains must reconcile with GTM subchains, which in turn, must reconcile with the international trade mainchain. Smart contracts and data can be shared among childchains and across blockchain tiers using standard facilities provided by blockchain vendors and by using specifically developed web-services similar to the currency exchange and token collateral infrastructure that is already widely adopted.

FIG. 4 shows a simplified example of a few possible cross chain links between GTM childchains to facilitate specific GTM operations. In one embodiment, the cross chain links between GTM childchains may be two way communication pegs or chain relays. The trade regulation compliance childchain 112 and the customs clearance childchain 113 are frequently used to distribute compliance and customs clearance data to other childchains. To facilitate cross chain links, customs clearance data including an import/export customs filings record 440, goods valuation data 308, and/or duty transaction record 442 may be organized and compressed into one or more customs blocks 443. Similarly, compliance data including security and private database screening results 326, applicable regulations retrieved from querying a GTM content database 411, and/or classification of goods data 328 may be organized and compressed into one or more compliance blocks 413. Customs blocks 443 and compliance blocks 413 containing information needed by other GTM childchains are then distributed to the relevant childchain.

In one possible export process leveraging multiple childchain interactions, an importer arranges for a letter of credit (L/C) to be delivered to an exporter. The trade regulation compliance childchain 112 executes compliance related contracts that query a GTM content database to determine applicable regulations 411 that apply to the L/C. Using the terms of the L/C received in a compliance block 413 from the trade regulation compliance childchain 112, the importer may also execute a function for calculating carrier costs 422 (e.g., landed cost) using an off chain GTM logistics module. Calculated carrier costs may then be published on the logistics blockchain 401. The exporter then sends a forwarding instruction to the freight forwarder accompanied by necessary documents (e.g., export and import permits) as determined by the L/C requirements received in the compliance block 413. A record of freight forwarding documents sent by the exporter may be recorded on the logistics and freight forwarding childchain 111 for reference by other GTM childchains in other GTM processes.

After receiving export documents, the freight forwarder completes the documents required for the goods to move and clear customs and ensures customs clearance for export purposes either manually or electronically. Transaction details generated during the customs clearance process are recorded on the customs childchain 403. The goods are then consolidated, containerized, delivered to the selected port, loaded on the nominated vessel for onward transportation to the foreign destination. A milestone for each of these logistics events is then recorded on the logistics and freight forwarding childchain 111 for tracing and tracking.

GTM import processes may similarly leverage multiple childchain interactions. In one possible import example an exporter sends all required import documents as specified by the applicable regulations 411 recorded on the trade regulation compliance childchain 112 to customs agents and the importer. Provided import documents may be recorded on the import/export filing record 440 on the customs clearance childchain 113. Upon arrival at an import destination, the import freight forwarder deconsolidates the shipment and issues the arrival notice to the customs agent and/or to the importer. At issuance, the arrival notice may be recorded on the customs clearance childchain 113 in the import/export filings record 410.

Transaction details for the consolidation, shipment, and arrival events may be recorded on the logistics and freight forwarding childchain 111 using a smart contract function that reads the import export filings record 410 to monitor the exchange of documents. New documents recorded in the import and export customs filing record 440 are pushed to the logistics and freight forwarding childchain 401 in customs blocks 443. Logistics event smart contracts running on the logistics and freight forwarding childchain 111 monitor import and export filing record activity by reading the customs clearance childchain and/or incoming customs blocks 443. When a new import document is published, the logistics event smart contract pushes a signature verification that prompts to the freight forwarder to verify completion of a transportation task that corresponds to the recorded import document (e.g., verify the arrival of a shipment subsequent to the recording of an import license). Freight forwarders may verify completion of a transportation event by submitting a digital signature to a logistics event smart contract or signature prompt pushed to an off chain logistics application that is reconciled on the logistics and freight forwarding childchain 111.

In parallel with the transportation logistics, the importer completes customs declaration and obtains clearance for import from the national customs authorities. Duties, taxes and other fees levied at customs declaration may be calculated using goods valuation data 308 with payment recorded in the duty transaction record 442. Instead of clearing customs in house, the importer may use the services of a clearing agent (customhouse broker) to undertake these tasks on his behalf. Either party uses the data stored in the import/export filing record 440 and information received in compliance blocks 413 to prepare documents. If the importer decides to use a customs agent, they must first screen the customs agent against one or more security database. By pushing database results 410 received from the trade regulation compliance childchain 112 in a compliance, cross chain links can facilitate the screening process The L/C terms of delivery and payments must be checked before the issuing bank effects payment. An audit smart contract may read the import and export customs filing record to authenticate the L/C and may similarly read the duty transactions record 442 to verify a duty payment amount in escrow. Using data stored on the logistics and freight forwarding childchain 111, compliance blocks 413, and customs blocks 443, the importer or his clearing agent prepares transportation documents presented to the freight forwarder together with instructions regarding the delivery of the goods. The goods are then delivered to the importer.

Other example cross chain links include sending database screening results 326, applicable regulations 411, classification of goods data 328, and import/export filing records 440 to the logistics and freight forwarding childchain 111 to facilitate preparation of transport manifests 420. Additionally, classification of goods data 328, applicable regulations 411, a goods valuation data 308 may be sent to the FTZ and warehouse management childchain 114 to provide information for preparing FTZ or CBW admission information 430. Database screening results 326 may be sent to the FTZ and warehouse management childchain 114 to authenticate authorized handlers 431 of goods within an FTZ or CBW. Lastly, applicable regulations 411, import and export customs filing records 307, and a duty transaction record 309 may be sent to the FTZ and warehouse management childchain 114 to verify FTZ compliance 432.

Hierarchical GTM blockchain systems leveraging one or more childchains can be replicated and customized to service any number of supply chains. The tiered blockchain system described herein is scalable across many supply chains because each request is localized in the dedicated childchain and consumes resources limited to a specific function. The immutable ledger provided by each childchain ensures that records can't be duplicated, manipulated or faked. This increased compliance visibility promotes unprecedented levels of trust, transparency, and collaboration among GTM participants. Data extracted from compliance activity would be cryptographically recorded in blockchain ledgers run by a consortium of companies that depend on GTM information. In this arrangement all GTM process participants would access to the same immutable record of data and have a say in how the data is managed.

The hierarchical blockchain system also provides the option to utilize unique and all-inclusive products definitions as an additional efficient link between the various system components and objects within the individual components. This feature alone saves considerable financial resources and time during order processing and cross-border movements.

The described approach allows for complex distributed GTM blockchain systems. Using blockchain technology driven by GTM applications, a GTM blockchain can reveal previously hidden information and enable users to make informed, automated decisions related to import and export compliance as it affects all areas of international supply chains, including sourcing, deliveries, and financials. Blockchain's ability to attach digital tokens (digital assets) to GTM smart contracts gives businesses greater flexibility and extended financial security in finding markets and pricing risks. It creates more efficient dynamic demand chains instead of rigid supply chains with pre-defined participants and fixed long-term contracts.

Block Aggregation Pipeline

Figure 5:
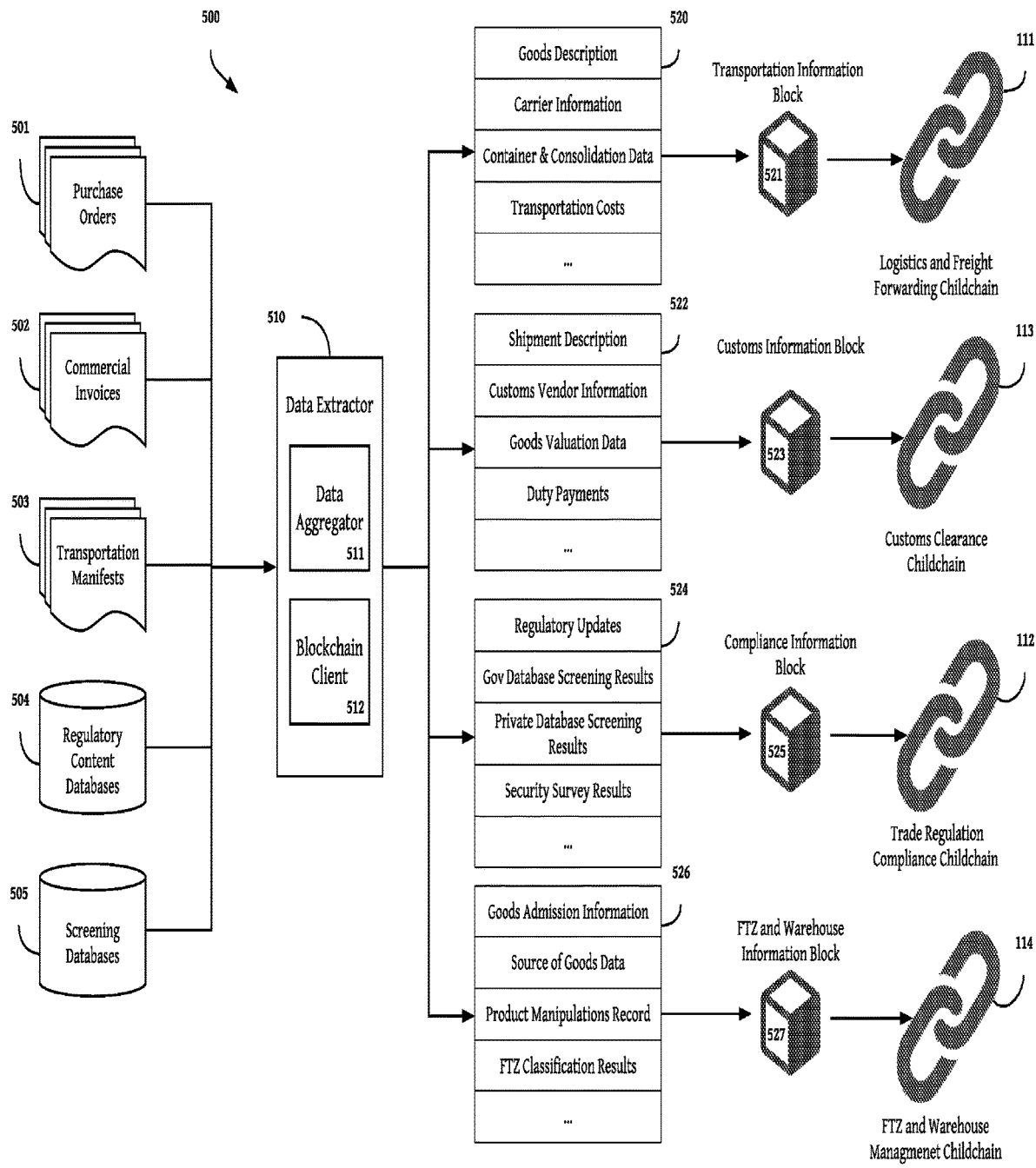
FIG. 5 is one non-limiting implementation of a data extraction pipeline for publishing GTM content on a GTM childchain.

GTM processes involve a high volume of documents and data distributed among many participants. To distribute data across the GTM childchain ecosystem, a data extraction pipeline is needed. An example data extraction and block formation pipeline 500 is shown in FIG. 5 the block data extractor 510 is implemented as a software application or software service on a GTM computer system and includes one or more software components or modules for performing specific tasks (e.g., data aggregator 511 and blockchain client 512). The blockchain client 512 interfaces with one or more blockchain systems including GTM childchain blockchains (e.g., logistics and freight forwarding childchain 111, customs clearance childchain 113, trade regulation compliance childchain 112, and FTZ and warehouse management childchain 114). The blockchain client 512 publishes GTM process specific childchain information blocks to the childchain that corresponds to the GTM process.

In one example, the block data extractor 510 includes program instructions for ingesting global trade documents used GTM processes including purchase orders 501, commercial invoices 502, transportation manifests 503 and GTM database search results. GTM content databases including regulatory content databases 504 and government security and private screening databases 505 may also be read and/or queried by the block data extractor 510 to populate one or more GTM process specific data tables 520-523 with global trade information. In one example, global trade information extracted by the block data extractor from ingested global trade documents and content databases includes shipment descriptions, goods carriers, goods travel destinations, goods valuation metrics, customs vendors, customs clearance event statuses, duty payments records, regulations effecting a shipment, security database screening results, compliance approval events, approving officers, free trade zone shipment admissions records, origin of goods records, goods manipulation records, and intra free trade zone transportation records.

Information obtained from the global trade documents and content databases is stored in memory as a data file. The data aggregator 511 reads the generic data files generated by the block data extractor 510 and pulls out GTM process specific data and organizes it into GTM process specific data tables. The data aggregator 511 and/or the block data extractor 510 may write extracted GTM process specific and/or generic data into a data structure that exposes the native text of the files or lists the file names and locations. The data aggregator 511 may further repackage data stored in GTM process specific tables into one or more GTM process specific childchain information blocks (e.g., transportation information block 521, customs information block 523, compliance information block 525, or FTZ and warehouse information block 527) that are published to a GTM childchain blockchain by the blockchain client 512. In one implementation, data files including smart contracts, childchain information blocks, and childchain summary blocks are published to a GTM childchain blockchain by writing the data files to a GTM childchain virtual machine.

In one possible example, the block data extractor 510 extracts goods description, carrier information, container and consolidation data, and transportation costs from purchase orders 501, commercial invoices 502, and transportation manifests 503. The data aggregator 511 complies this information into a transportation information data table 520. After performing compression operations, the data aggregator 511 then writes some or all of the transportation information data table 520 to a transportation information block 521 that is published to a logistics and freight forwarding childchain 111 by the blockchain client 512.

To publish blocks to the customs clearance childchain 113, the block data extractor 510 extracts shipment description, customs vendor information, goods valuation data, and duty payments from purchase orders 501, commercial invoices 502, transportation manifests 503, regulatory content databases 504, and screening databases 505. The data aggregator 511 reads extracted customs information from a generic data file and arranges it in a customs information data table 522. After performing compression operations, the data aggregator 511 writes at least a portion of the customs information to a customs information block 523 that gets published on the customs clearance childchain 113 by the blockchain client 512.

In one possible example, the block data extractor 510 initializes compliance information block creation by extracting regulatory updates, government database screening results, private database screening results and security survey updates from commercial invoices 502, purchase orders 501, regulatory content databases 504, and screening databases 505. The data aggregator 511 reads extracted compliance information from a generic data file and arranges it in a compliance information data table 524. After preforming compression operations, the data aggregator 511 writes at least a portion of the compliance information to a compliance information block 525 that gets published on the trade regulation compliance childchain 112 by the blockchain client 512.

To publish blocks to the FTZ and warehouse management childchain 114, the block data extractor 510 extracts goods admission information, source of goods data, product manipulation records, and FTZ classification results from purchase orders 501, commercial invoices 502, transportation manifests 503, and regulatory content databases 504. The data aggregator 511 reads extracted FTZ information from a generic data file and arranges it in a FTZ information data table 524. After preforming compression operations, the data aggregator 511 writes at least a portion of the FTZ information to a FTZ and warehouse information block 525 that gets published on the FTZ and warehouse management childchain 114 by the blockchain client 512.

Figure 6:
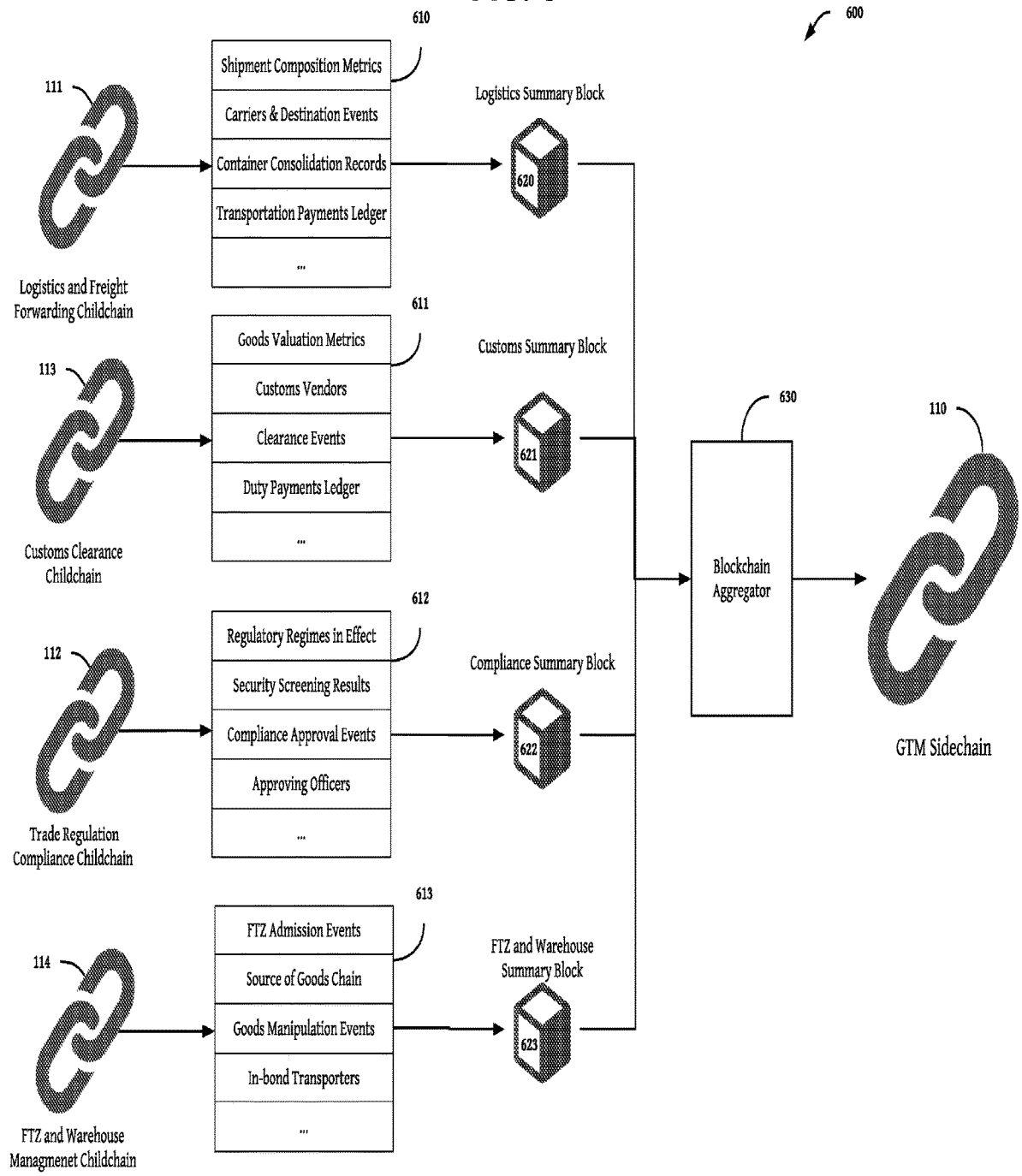
FIG. 6 shows one example of a block aggregation pipeline for reconciling lower tier childchain blockchains with upper tier blockchain systems in the hierarchical blockchain architecture.

To provide scalable solutions for complex GTM processes, information stored in lower tiers of a hierarchical blockchain system (e.g., GTM childchains) must reconcile with records maintained in upper tiers of the hierarchical blockchain system. One example reconciliation mechanism across blockchain tiers within a GTM hierarchical blockchain system is shown in FIG. 6. In one implementation, the blockchain reconciliation and block aggregation pipeline 600 includes four low tier blockchain systems: a logistics and freight forwarding childchain 111, a customs clearance childchain 113, a trade regulation compliance childchain 112, and an FTZ and warehouse management childchain 114. The blockchain aggregator 630 reads the low tier childchain blockchains an extracts information summarizing activity in each GTM childchain. Summary information is then arranged in one or more summary blocks that are published on a higher tier blockchain system (e.g., a GTM sidechain or GTM subchain) 640.

In one implementation, childchain summary data is compiled into one or more childchain data tables 610-613. Summary data includes high level information generated by smart contracts running on GTM childchains and/or operations performed on GTM software modules (e.g., results of calculations, consolidated metrics, completed events, completed payments, and participating parties). More detailed information such as eligible vendors, in progress events, raw data for performing one or more GTM calculations, requested payments, and document filings in review are not included in summary blocks and may be stocked on a childchain or off chain in a GTM computer system.

At least a portion of the information included in the data tables 610-613 is compressed and arranged into a summary block. In one implementation, the logistics summary block 620 may include information from a logistics summary data comprising shipment composition metrics, carriers and destination events, container consolidation records, and transportation payments ledger records. A non-limiting list of information that may be included in the customs summary 621 block includes goods valuation metrics, customs vendors providing services, customs clearance events, and duty payment ledger records. A non-limiting example of information included in a compliance summary block 622 includes regulatory regimes in effect, security screening results, compliance approval events, and approving officers. A non-limiting list of information that may be included in the FTZ and warehouse summary block 623 includes FTZ admission events, source of goods chain of transfer, goods manipulation events, and in-bond transporters.

Summary blocks 620-623 generated by the blockchain aggregator 630 are then further reduced to subchain blocks and published to a higher tier blockchain system within the GTM hierarchical blockchain architecture. Publishing only the summary subset of data from lower childchain tiers on a higher tier GTM blockchain 640 (e.g., a GTM sidechain or a GTM subchain), provides a scalable way to reconcile lower blockchain tiers with upper blockchain tiers with minimal data loss. Using a similar mechanism and a second block aggregator (not shown), GTM sidechains may be reconciled with a GTM subchain or an international trade mainchain. By intelligently reducing (e.g., leaving out redundant details and keeping important events that have already occurred) the volume of data retained from lower blockchain tiers that is republished on higher tier blockchains, several lower tier blockchains can be reconciled with one higher tier blockchain. This configuration allows activity on many lower tier chains to be monitored by reading one upper tier blockchain.

Example System for Implementing a Hierarchical Blockchain Architecture

Figure 7:
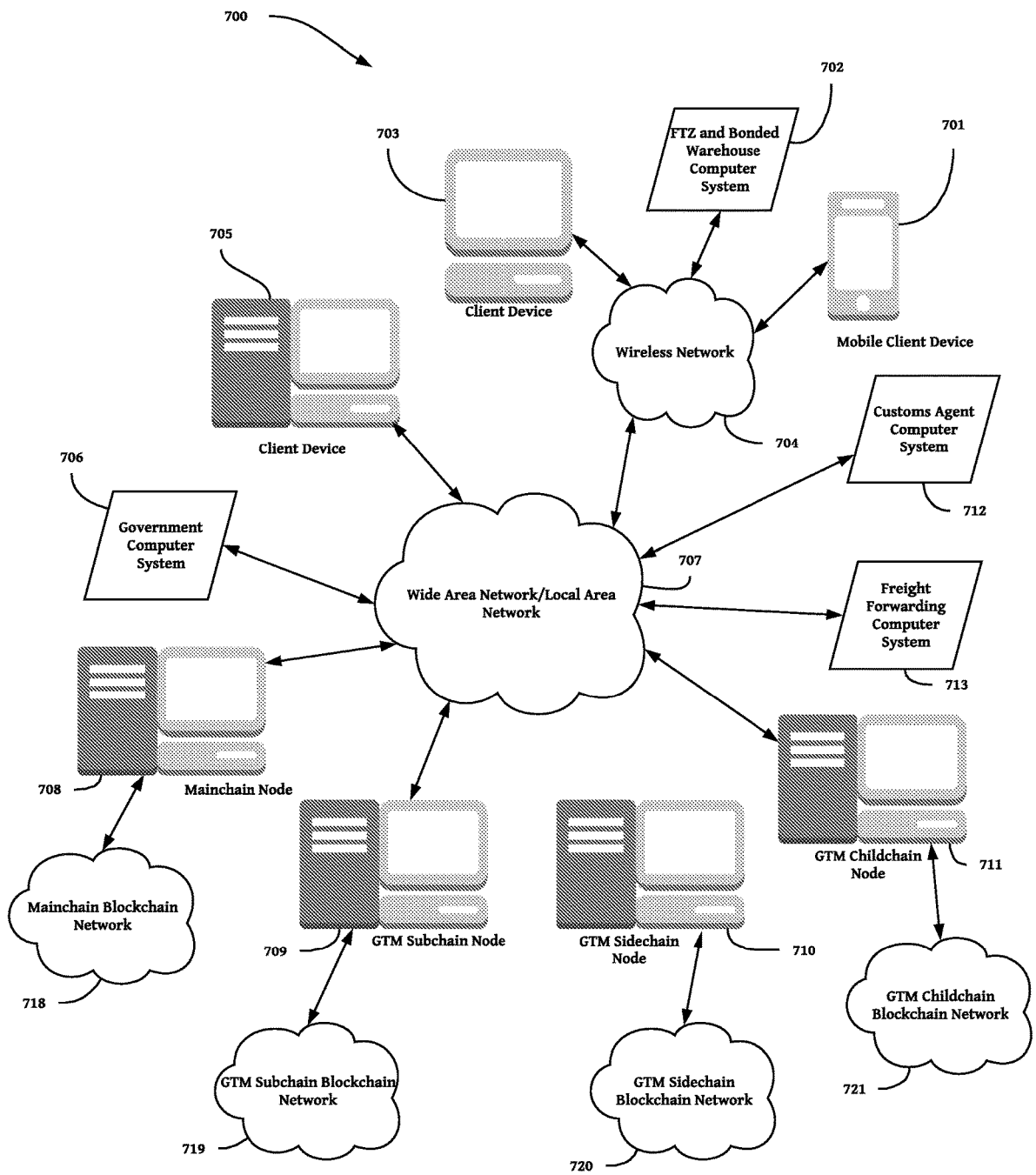
FIG. 7 shows a system diagram of an environment for implementing the hierarchical blockchain architecture of FIG. 1.

FIG. 7 shows components of one embodiment of an environment in which the invention may be practiced. Not all the components may be required to practice the invention, and variations in the arrangement and type of the components may be made without departing from the spirit or scope of the invention. As shown, system 700 of FIG. 7 includes local area networks ("LANs")/wide area networks ("WANs") (network) 707, wireless network 704, client devices 701, 703, and 705, blockchain nodes 708-711, blockchain networks 718-721, and GTM computer systems 702, 706, 712, and 713.

One embodiment of client devices 701, 703, and 705 is described in more detail below in conjunction with FIG. 8. In one embodiment, at least some of client devices 701, 703, and 705 may operate over a wired and/or a wireless network such networks 707 and 704. As shown, client devices 701, 703, and 705 may include virtually any computing device capable of communicating over a network to send and receive information, including instant messages, performing various online activities, or the like. The set of such devices may include devices that typically connect using a wired or wireless communications medium (e.g., personal computers, multiprocessor systems, microprocessor-based or programmable consumer electronics, network PCs, laptop computers, smart phones, tablet computers, cellular telephones, display pagers, radio frequency ("RF") devices, infrared ("IR") devices, Personal Digital Assistants ("PDAs"), handheld computers, wearable computers or the like). Moreover, client devices 701, 703, and 705 may provide access to various computing applications, including a browser, or other web-based application.

A web-enabled client device may include a browser application that is configured to receive and to send web pages, web-based messages, and the like. The browser application may be configured to receive and display graphics, text, multimedia, media content, and the like, employing virtually any internet based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Audio Language ("HTML"), eXtensible Markup Language ("XML"), and the like, to display and send a message. In one embodiment, a user of a client device may employ the browser application to perform various activities over a network (online). However, another application may also be used to perform various online activities. Example application may include a desktop client for managing and playing content and developer/publisher portal for creating and managing content licenses and uploading content.

Client devices 701, 703, and 705 may also include at least one other client application that is configured to receive and/or send content between another computing device. The client application may include a capability to send and/or receive content, or the like. The client application may further provide information that identifies itself, including a type, capability, name, and the like. In one embodiment, client devices 701, 703, and 705 may identify themselves as part of a class of devices. In another embodiment, client devices 701, 703, and 705 may uniquely identify themselves through any of a variety of mechanisms, including a phone number, Mobile Identification Number ("MIN"), an electronic serial number ("ESN"), Internet Protocol (IP) Address, network address, or other mobile device identifier. The identification information may also indicate a content format that the mobile device is enabled to employ. Such information may be provided in a network packet, or the like, sent between other client devices, blockchain nodes, GTM computer systems, or other computing devices.

Client devices 701, 703, and 705 may further be configured to include a client application that enables an end-user to log into an end-user account that may be managed by another computing device, such as a GTM computer system, or the like. Such end-user account, in one non-limiting example, may be configured to enable the end-user to manage one or more online activities, including in one non-limiting example, GTM functions including calculations, regulations research, import and export document preparation, search activities, browse various websites, communicate with other users, or the like. However, participation in online activities may also be performed without logging into the end-user account.

Wireless network 704 is configured to couple client devices 701, 703, and 705 and its components with a network 707. Wireless network 704 may include any of a variety of wireless sub-networks that may further overlay stand-alone ad-hoc networks, and the like, to provide an infrastructure-oriented connection for client devices 701, 703, and 705. Such sub-networks may include mesh networks, Wireless LAN ("WLAN") networks, cellular networks, and the like. In one embodiment, the system may include more than one wireless network.

Wireless network 704 may further include an autonomous system of terminals, gateways, routers, and the like connected by wireless radio links, and the like. These connectors may be configured to move freely and randomly and organize themselves arbitrarily, such that the topology of wireless network 704 may change rapidly.

Wireless network 704 may further employ a plurality of access technologies including 2nd (2G), 3rd (3G), 4th (4G), 5th (5G) generation radio access for cellular systems, WLAN, Wireless Router ("WR") mesh, and the like. Access technologies such as 2G, 3G, 4G, 5G and future access networks may enable wide area coverage for mobile devices, such as client devices 701, 703, and 705 with various degrees of mobility. In one non-limiting example, wireless network 704 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like.

Network 707 is configured to couple network devices with other computing devices, including, GTM computer systems, blockchain nodes, and through wireless network 704 to client devices 701, 703, and 705. Network 707 is enabled to employ any form of network mechanism for communicating information from one electronic device to another. Also, network 707 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 707 may be configured to transport information on an Internet Protocol ("IP").

Additionally, network mechanisms by way of example, network mechanisms include wired media such as twisted pair, coaxial cable, fiber optics, wave guides, and other wired media and wireless media such as acoustic, RF, infrared, and other wireless media.

The client devices 701, 703, 705 may include a blockchain client for interacting with one or more blockchain nodes through a wireless network 704 or network 707. In one example, the client devices 701, 703, and 705 may interface with a GTM childchain node 711 running a GTM childchain blockchain, a GTM sidechain node 710 running a GTM sidechain blockchain, a GTM subchain node 709 running a GTM subchain blockchain, and/or a mainchain node 708 running an international trade mainchain blockchain. Example interactions between client devices and blockchain nodes include reading the blockchain to track shipments, interacting with smart contracts, and transferring payment. In this example, the GTM childchain node 711 runs a GTM childchain blockchain by participating (i.e., performing operations) in a GTM childchain blockchain network 721. The GTM sidechain node 710 runs a GTM sidechain blockchain by participating in a GTM sidechain blockchain network 720. The GTM subchain node 709 runs a GTM subchain blockchain by participating in a GTM subchain blockchain network 719. The mainchain node 708 runs an international trade mainchain blockchain by participating in a mainchain blockchain network 718. Each blockchain network 718-721 may include a plurality of participating blockchain nodes. Many participating nodes in an important feature of a blockchain network because it allows network control and blockchain storage to be decentralized across many participating parties.

The client devices 701, 703, and 705 may also run one or more off chain GTM applications that interface with a GTM computer system. In particular, the client devices 701, 703, and 705 may interface with a FTZ and bonded warehouse management computer system 702, a government computer system (e.g., a customs clearance agency or border patrol) 706, a customs agent computer system 712, and/or a freight forwarding computer system 713. Example interactions between client devices and GTM computer systems include querying security databases, preparing and submitted customs clearance paperwork, participating in auctions for container space and GTM services, and researching and engaging with vendors.

Figure 8:
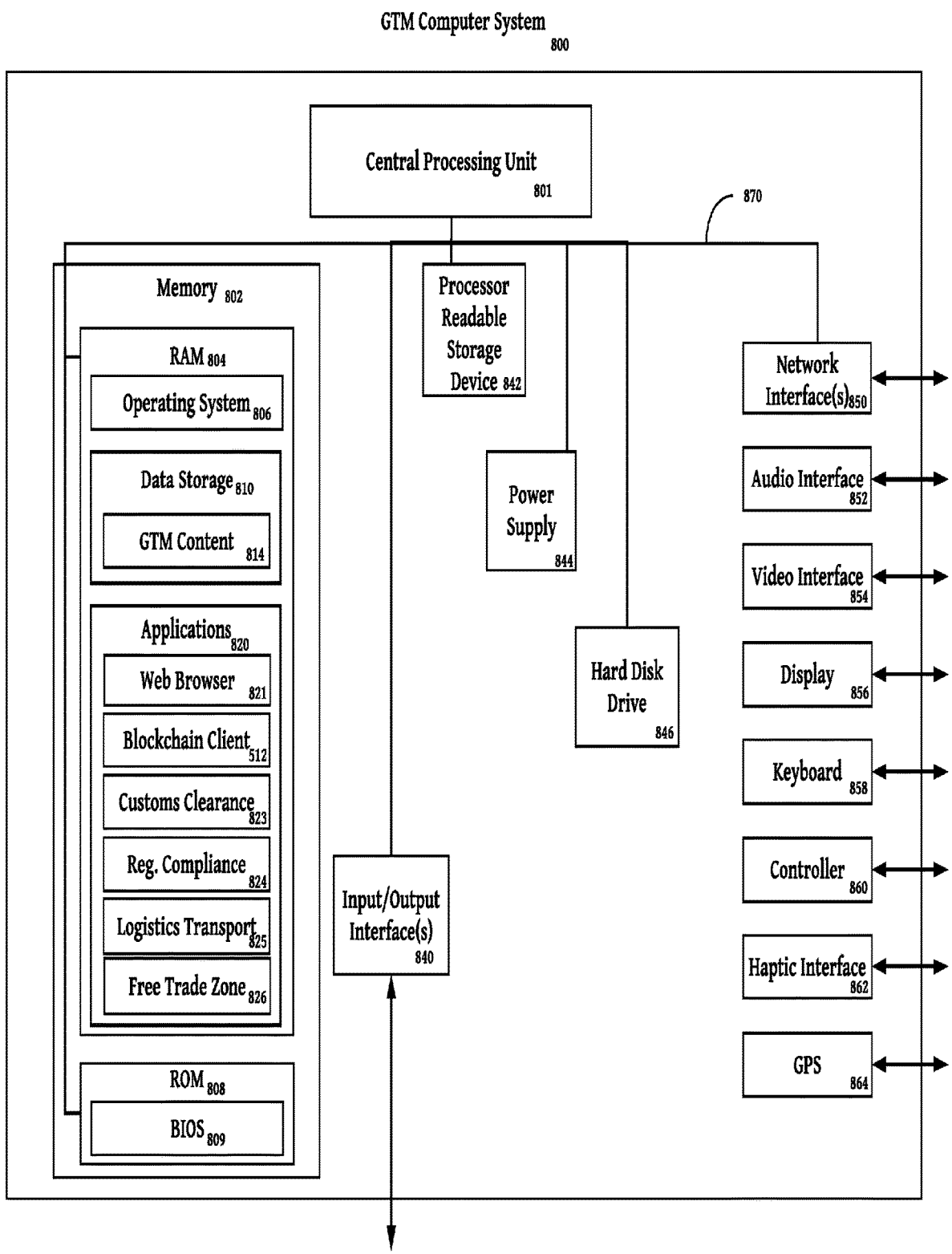
FIG. 8 illustrates one possible embodiment of a client device usable by a GTM participant within the environment of FIG. 1.

FIG. 8 shows one possible GTM computer system 800, according to one embodiment of the invention. GTM computer system 800 may include many more or less components than those shown. The components shown, however, are sufficient to disclose an illustrative embodiment for practicing the invention. GTM computer system 800 may be configured to operate as a server, a client, a peer, a host, or any other device. In one example embodiment having one or more applications for managing GTM operations, the GTM computer system 800 may represent a desktop computer or GTM network server that provides access to smart contracts, GTM content stored off chain, third party GTM vendor computer systems, and one or more distributed data structures within a hierarchical blockchain architecture, for example, GTM childchains.

GTM computer system 800 includes a central processing unit 801, processor readable storage device 842, network interface unit 850, input/output interfaces 840, hard disk drive 846, a power supply 844, and a mass memory 802, all in communication with each other via a system bus 870. The mass memory 802 generally includes RAM 804, ROM 808 and one or more permanent (non-transitory) mass storage devices, such as hard disk drive 846, tape drive, optical drive, and/or floppy disk drive. The mass memory 802 stores an operating system 806 for controlling the operation of the GTM computer system 800. Any general-purpose operating system may be employed. BIOS 809 is also provided for controlling the low-level operation of the GTM computer system 800. As illustrated in FIG. 8, GTM computer system 800 can communicate with the Internet, or some other communications network, via network interface unit 850, which is constructed for use with various communication protocols including the TCP/IP protocol. Network interface unit 850 is sometimes known as a transceiver, transceiving device, or network interface card (NIC).

The GTM computer system 800 also comprises input/output interfaces 840 for communicating with external devices, such as a keyboard 858, audio system 852, video interface 854, display 856, controller 860, haptic system 862, GPS device 864, or other input or output devices not shown in FIG. 8. Input/output interfaces 840 can utilize one or more wired or wireless communication technologies, such as USB, infrared, Bluetooth™, Wi-Fi, or the like.

The mass memory 802 as described above illustrates one type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

In one non-limiting example, mass memory 802 includes RAM that stores an operating system 806, data storage module 810, and one or more applications 820. The data storage module 810 may include a database, text, spreadsheet, folder, file, or the like, that may be configured to maintain and store user account identifiers, user profiles, email addresses, IM addresses, and/or other network addresses, or the like. Program code, data, algorithms, and the like, for use by a processor, such as central processing unit 801 to execute and perform actions may also be held in the data storage module 810. In one embodiment, at least some of memory resources available to the data storage module 810 might also be held in another component of a GTM computer system 800, including, but not limited to processor readable storage device 842, hard disk drive 846, or the like. The data storage module 810 may read data stored in these components into RAM 804 or write data generated by one or more applications or other client device processes to one or storage components not included in main memory 802.

The data storage module 810 may further store GTM content files 814 for use in one or more applications. Some GTM content files 814 may be held in the data storage module 810 because they are too large to persist in a distributed storage system (e.g., a childchain or other blockchain). GTM content files 814 include any of a variety of content related to GTM operations. For example, invoices, purchase orders, geo-specific trade regulation compliance information including trade compliance rules and regulations, security screening databases, private screening databases, security survey forms, and goods classification schedules; geo-specific customs clearance information including import customs filing forms, duty rates, goods valuation schedules, export customs filing forms, import customs filing forms, and duty payment records; logistics information including transportation manifests, databases of authorized transporters, arrival notice forms, and carrying permits; and free trade zone and bonded warehouse information including free trade zone admission information, databases of authorized warehouse goods handlers, free trade zone goods manipulations records, and free trade zone compliance verification documents. GTM content files may also include data extracted from one or more GTM documents by the data extractor of FIG. 5.

GTM content 814 may be bound to one or more accounts, applications, or other unique identifier associated with a user, service provider network, shipment, or group of shipments to enable confidentiality and promote security. All or a selection of GTM content 814 may also be shared across applications, permissioned users, or service provider networks to facilitate collaboration between selected users and service providers and allow information to be used in multiple applications without redundant copying.

The mass memory 802 also stores program code and data. One or more applications 820 are loaded into mass memory 802 and run-on operating system 806. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web browser 821, blockchain client 512, and GTM applications including a customs clearance application 823, regulatory compliance application 824, logistics transport application 825, and free trade zone application 826 are specific examples of application programs that may be included within applications 820 running on a GTM computer system 800.

A web-enabled GTM computer system 800 may include a web browser application 821 configured to receive and to send web pages, web-based messages, and the like. The web browser application 821 may be configured to receive and display graphics, text, multimedia, media content, and the like, employing virtually any internet based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WML Script, JavaScript, Standard Generalized Markup Language ("SGML"), HyperText Markup Audio Language ("HTML"), eXtensible Markup Language ("XML"), and the like, to display and send a message. In one embodiment, a user of a GTM computer system 800 may employ the web browser application 821 to perform various activities over a network (online).

Other application in addition to the web browser 821 may also be used to perform various online activities. Other internet enabled applications may include a blockchain client 512 for interfacing with a blockchain virtual machine or blockchain network. GTM applications (e.g., 823-826) may also send and receive GTM content files 814 and messages from other GTM service provider computer systems including transportation vendors, customs clearance intermediaries, financial intermediaries, or government agencies regulating trade activities other one or more Internet communications protocols.

Blockchain client 512 connects applications 820 running on a GTM computer system 800 to one or more blockchain networks within the hierarchical blockchain architecture. In one possible example, the blockchain client 512 communicates with a blockchain node by interfacing with a blockchain virtual machine. The blockchain client 512 may publish smart contracts generated on one or more applications 820 to a GTM childchain corresponding to the GTM application that generated the contract (e.g., a logistics transport application generates a logistics service auction contract that gets published to a logistics and freight forwarding childchain). To facilitate deployment of smart contracts, the blockchain client 512 may include a smart contract complier to compile smart contract code into bytecode or another format readable by a blockchain virtual machine. The blockchain client may also initiate and conduct one or more smart contract migrations to update smart contract code or deploy the smart contract on a different blockchain system. Other blockchain interactions including verifying on chain transactions, reading a record of previous transactions, accessing data stored on chain in a block, smart contract, or distributed data service, or auditing behavior of other nodes participating in a blockchain network may be performed using the blockchain client 512.

Customs clearance application 823 facilities GTM customs operations, for example, goods valuation, duty payments, and customs agent verification. The customs clearance application 823 retrieves GTM content 814 related to customs operations including descriptions of goods containing in a shipment, approved customs agent contact information, geo-specific requirements for goods valuation, assigned harmonized tariff numbers, goods valuation evidence, and geo-specific duty rates. GTM content 814 received by the customs clearance application 823 may be raw unprocessed forms, invoices, purchase orders, or duty schedules. Alternatively, it may be preprocessed into spreadsheets, data streams, or a machine-readable file format (e.g., JSON or XML file) before being used in additional operations performed by the customs clearance application 823.

Upon receiving description of goods information and geo-specific customs and duty information, the customs clearance application 823 may facilitate preparation of customs clearance documents. Geo-specific duty rates and customs regulations may also be researched and processed using the customs clearance application 823 to perform one or more duty calculations to generate expected duty payments for a shipment. Databases of customs agents may also be screened by the customs clearance application 823 to identify a list of approved customs agent. The customs clearance application 823 may also connect with third party GTM computer systems (e.g., a customs agent and/or duty collection service computer systems) to transfer customs payments, make adjustments to overpaid or underpaid values, and facilitate drawback or transfer of excess payments. Completion of customs events, payment for customs agent services, and results of operations performed by the customs clearance application 823 may be published in a smart contract or aggregated into a customs clearance information block (as shown in FIG. 5) that is distributed to a blockchain system (e.g., a customs clearance childchain).

The regulatory compliance application 824 facilitates GTM compliance operations, for example, classification of goods, security screening, and compliance verification. The regulatory compliance application 824 may interface with a data storage module 810 to access geo-specific trade regulations stored as GTM content files 814. Periodically, regulatory GTM content files 814 are updated to reflect changes made to trade compliance laws in particular jurisdictions. The regulatory compliance application 824 reads the regulatory GTM content files 814 to track changes and push notifications to application administrators prompting them to consider the regulatory update. Once changes to GTM regulations are detected, the regulatory compliance application 824 is reprogrammed to ensure users comply with the new regulation.

The regulatory compliance application 824 may also complete county specific security compliance operations. Example GTM compliance operations required to import and/or export goods from one county to another include screening county specific security database to detect banned customers and GTM service providers and preparing security survey responses. Security databases screened by the regulatory compliance application 824 include Office of Foreign Control (OFAC) restricted countries and persons lists, anti-terrorist lists, drug dealer lists, nuclear related lists, and export control lists. Goods classification databases including the Export Control Classification Number (ECCN) schedule and import restrictions (e.g., quotes, permit requirements, classes of restricted goods) lists may also be screened by the regulatory compliance application 824. Users may also add private databases including lists of nonpaying customers, locations having complex delivery logistics, and goods having amount restrictions to the regulatory compliance application 824 to deploy a customs screening process.

Database screening processes completed by the regulatory compliance application 824 are used throughout the GTM process. Every service provider handling a shipment of goods at any point during the global trade pipeline must pass security screening to avoid customs and compliance difficulties. Therefore, the regulatory compliance application 824 may interface with one or more GTM applications to extract organizations and persons to screen and/or provide screening results to populate forms or otherwise document compliance with regulations requiring security database screening.

Geo-specific security surveys may also be completed within the regulatory compliance application 824. Automated, manual, and/or a combination of auto populate with manual free text security survey forms may be provided within the regulatory compliance application 824. Example survey forms provided in the regulatory compliance application include the C-TPAT form used by the US government, the AEO form used in Europe, and the PIP form used in Canada. Completion of compliance events, payment for compliance verification services, and results of database screening, goods classification, security surveying, or other operations performed by the regulatory compliance application 824 may be published in a smart contract or organized into a compliance information block distributed to a blockchain system.

The logistics transport application 825 facilitates GTM transport and freight forwarding operations. In one example, the logistics transport application 825 interfaces with one or more freight forwarding computer systems to track shipments and receive confirmation of shipment pickups and completed deliveries. Some or all of the information received from freight forwarding computer systems may be included written to GTM content files 814 stored in the data storage module 810. The data extractor of FIG. 5 may further process freight forwarding GTM content files 814 to generate freight forwarding information blocks that are published by the blockchain client 512 to one or more blockchain systems (e.g., the logistics and freight forwarding childchain) within the hierarchical blockchain architecture.

The logistics transport application 825 may also facilitate preparation of shipping documents (e.g., import and export licenses, transportation manifests, bills of landing, air way bills, and transportation invoices). By extracting shipment of goods information from purchase orders and invoices and regulatory information from regulatory GTM content files, the logistics transport application 825 can prepopulate some or all of the information in the shipping documents. Shipping documents can then be shared with customs agents, carriers, warehouses, purchasers, and other parties included in shipping operations via a messaging platform built into the logistics transport application 825. Time stamped records confirming document creation and sharing with one or more parities can be included in a logistics information block and sent to one or more blockchain systems within the hierarchical blockchain architecture.

Carrier costs calculations, transportation time estimates, freight forwarder service provider verification, and payment of transportation costs are addition functions that may be performed within by the logistics transport application 825. Information needed to perform each of these tasks may be extracted from GTM content files 814. Records of operations performed by the logistics transport application 825 as well as the results of those operations (e.g., transportation costs and time estimates, presence of a carrier on a whitelist, and payment date and amount) may be aggregated into a logistics information block published on one or more blockchain systems by the blockchain client 512.

The free trade zone application 826 facilitates movement of goods into and out of a FTZ or CBW. Manipulations of goods within a FTZ or CBW may also be tracked and documented by the free trade zone application 826. In one embodiment, the free trade zone application 826 extracts information from raw documents (e.g., invoices, purchase orders, transportation manifests, and customs filings) to auto populate and/or auto generate FTZ admissions forms. Documents describing manipulation of goods within a FTZ may also be prepared using the free trade zone application 826.

Other operations formed by the free trade zone application 826 include authorizing handlers of goods, verifying FTZ compliance, calculating duties saved by using a FTZ, and calculating export duties for taking goods out of an FTZ. The free trade zone application may interface with one or more applications 820 or client device components (e.g., a regulatory compliance application 824 or customs clearance application 823) to perform FTZ operations). To select the FTZ compliance forms that need to be submitted to comply with regulations in a specific FTZ, the free trade zone application 826 may read FTZ regulations from GTM content files 814 or receive FTZ regulatory content from a regulatory database search performed on a logistics and freight forwarding childchain application 824. Based on the selected forms, the free trade zone application 826 may review movement and/or manipulations of goods documents prepared using the application to verify compliance. The free trade zone application 826 may also read GTM content files 814 or retrieve security database screening results from the regulatory compliance application to whitelist a handler of goods or CM operator.

In addition to document preparation and verification, the free trade zone application 826 also may perform duty calculations. In one example, the free trade zone application 826 determines the amount of duty saved by operating within a FTZ relative to a regular non-duty free area. Calculations may be based on duty rates stored in GTM content files, operations performed in the FTZ extracted from purchase orders, previous duty savings calculations conducted on similar shipments, and other data effecting the duty rate of a shipment of goods. Using similar information, the free trade zone may also determine the duty payment required to move goods out of an FTZ to clear then for sale in a domestic or foreign market. Records of operations performed by the free trade zone application 826 as well as the results of those operations (e.g., duty payment and savings estimates, presence of a handler on a whitelist, and payment date and amount) may be aggregated into a FTZ information block published on one or more blockchain systems by the blockchain client 512.

Software Architecture for Deploying and Interacting with Smart Contract

Figure 9:
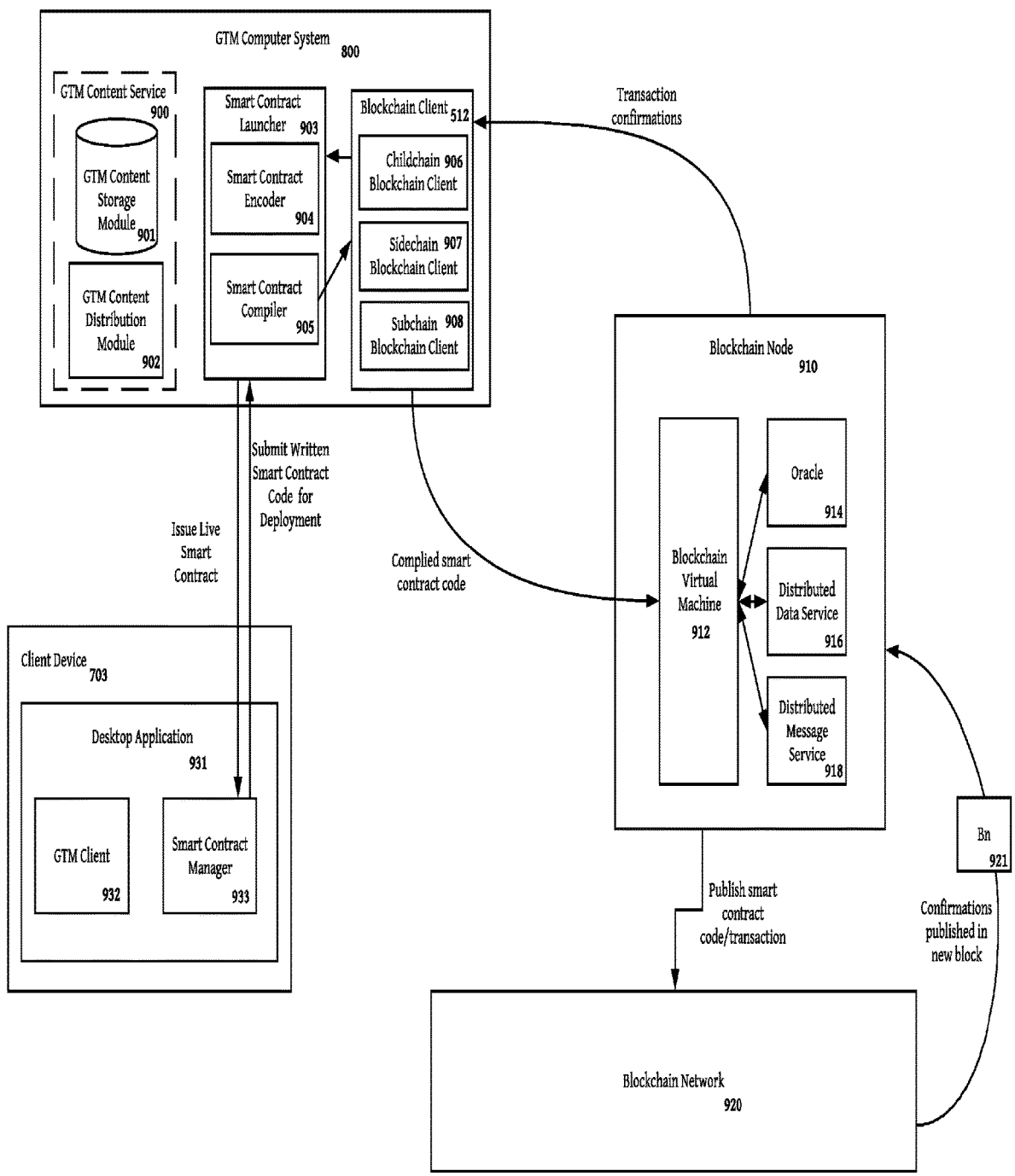
FIG. 9 is one possible implementation of a software architecture for deploying GTM smart contracts.

FIG. 9 illustrates an example software architecture deploying GTM smart contract. By providing a front end for interacting with the GTM service device 900, the desktop application enables users to interact with blockchain systems and GTM content. The GTM client 932 may be associated with a unique user ID or account so that the GTM client 932 and smart contract manager 933 are unique to a user. In one example, the desktop application 931 may be a web browser-based application that can be accessed on any client device 703 connected to the Internet. In one implementation, smart contract code may be written in a terminal or other user interface within a smart contract manager modal 933 displayed as a feature of a GTM client 932 running within a desktop GTM application 931. Written smart contract code is then submitted to a GTM computer system 800 for deployment on a blockchain system included in the hierarchical blockchain architecture.

The GTM computer system 800 runs the backend operations of the desktop application 931 that gets displayed to users. A GTM content storage module 901 stores all GTM content files (e.g., regulatory, customs clearance, logistics, and FTZ content files) provided to GTM desktop applications 931. The GTM content distribution module 902 ensures efficient delivery of GTM content files across all users of a GTM platform by balancing the load of GTM content requests coming from a plurality of client devices 703 running instances of a GTM desktop application 931. To deploy a smart contract received form the content manager 933, the GTM servicer device leverages a smart contract launcher 903 that includes a smart contract encoder 904 and a smart contracts complier 905. Optionally, the smart contract launcher 903 may include a migrations engine (not shown) for updating deployed contracts and moving smart contracts across one or more blockchain networks. The smart contract encoder 903 encodes the smart contract terms written in the smart contracts manager 933 to a smart contract language (e.g., Solidity). Encoded smart contract language is then complied into bytecode and/or ABI by the smart contract compiler.

Complied smart contracts language is provided to a blockchain client 512 that deploys the smart contract on a blockchain network. In one implementation, the blockchain client 512 deploys complied smart contract code to a contract address on a blockchain virtual machine 912 running on a blockchain node 910. In this figure, the blockchain node may represent any blockchain node within the hierarchical blockchain architecture including a mainchain node 708, a GTM subchain node 709, a GTM sidechain node 710, and a GTM childchain node 711. Each type of blockchain node 910 has a blockchain virtual machine 912 that performs operations on a blockchain network 920. The mainchain node 708 includes a mainchain blockchain virtual machine that performs operations on the mainchain blockchain network 718. The GTM subchain node 708 includes a GTM subchain virtual machine that performs operations on a GTM subchain blockchain network 719. The GTM sidechain node 710 includes a GTM sidechain virtual machine that performs operations on a GTM sidechain blockchain network. The GTM childchain node 711 includes a GTM childchain virtual machine that performs operations on a GTM childchain blockchain network 721. Optionally, each blockchain node (708-711) includes an oracle 914, distributed data service 916, and distributed message service 918.

The blockchain client 512 may include a childchain blockchain client 906 that deploys smart contract code to a contract address on a GTM childchain virtual machine; a sidechain blockchain client 907 that deploys smart contract code to a GTM sidechain virtual machine; and a subchain blockchain client 908 that deploys smart contract code to a GTM subchain virtual machine. Childchain blockchain clients 906, sidechain blockchain clients 907, and subchain blockchain clients 908 may perform other interactions with virtual machines running their corresponding blockchains including reading blocks published to the blockchain, writing information to new blocks, retrieving network transaction history, sending messages to one or more nodes participating in the blockchain network, and executing deployed smart contract code.

Deployed and complied smart contract code is then published to a blockchain network 920 from the blockchain virtual machine 912. One published on chain, the any node participating in the network 920 can view and interact with the smart contract by calling one or more of its functions. Updates to the smart contract and transactions performed by the smart contract must be approved by a consensus of nodes participating in the blockchain network before they become official and are published in a new block that gets added to the blockchain. Once deployed to the blockchain virtual machine 912 smart contracts must also be approved by a majority of nodes participating in the network 920 before publication to a contract address on the blockchain network 920.

The blockchain virtual machine 912 may interact with other resources on the blockchain node to provide additional smart contract functionality. In particular, the blockchain virtual machine may interface with an oracle 914 to deliver results of external, off chain events (e.g., current events, operations performed by off chain computer systems) to the smart contract. Additionally, by linking deployed smart contracts with a distributed data service 916 data (e.g., a whitelist of approved vendors, record of customs filings, or the highest bidders in a container auction) may be stored in a smart contract. Error messages and requests for modifying and/or auditing smart contract transactions received from other nodes participating the blockchain network 920 may also be published to the smart contract through a distributed message service 918.

Figure 10:
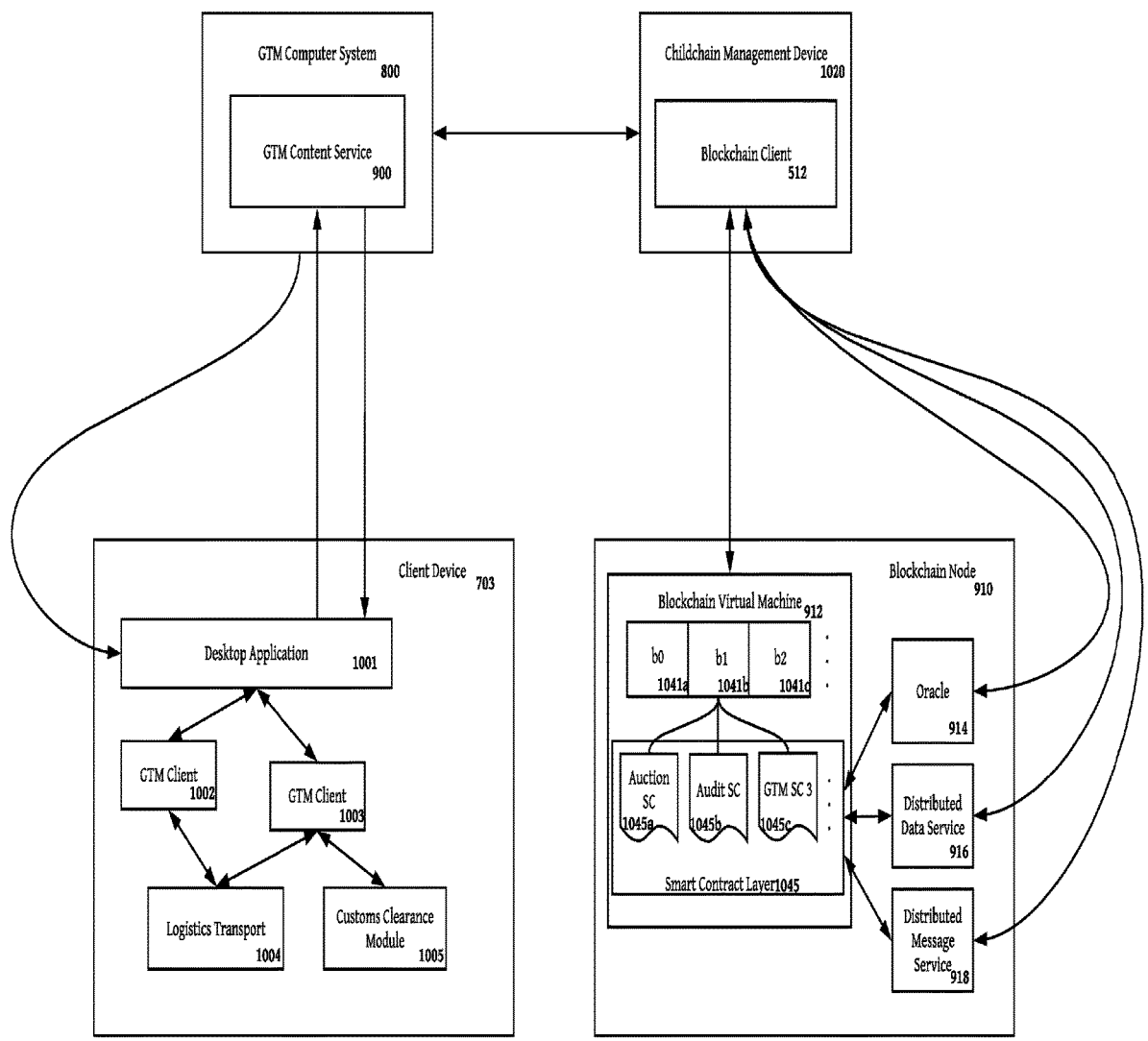
FIG. 10 shows one example implementation of a software architecture for interacting with GTM smart contracts.

One example architecture for interacting with smart contracts deployed on chain is shown in FIG. 10. In one possible implementation, users interact with smart contracts through a front end running on a client device 703. The front end may comprise a user interface included in a GTM module (e.g., a logistics module 1004 or customs clearance module 1005) running on a GTM client 1002 and 1003. Each user of the GTM platform may run one or more GTM clients 1002 and 1003 to provide simultaneous access to multiple GTM modules within a single desktop application 1001. To provide content and functionality to the GTM modules 1004-1004, the GTM content service 900 communicatively couples to the desktop application 1001 and provides remote access to GTM applications running on a GTM computer system 800 (e.g., a customs clearance application 823, a regulatory compliance application 824, a logistics transport application 825, and a free trade zone application 826).

The GTM content service 900 also provides GTM content files to desktop applications 1001 running on a plurality of client devices 703. By interfacing with a childchain management device 1020, the GTM content service 900 also distributes data read from a blockchain node to desktop applications 1001. The childchain management device 1020 may run of the same GTM computer system 800 as the GTM content server 1011. Alternatively, to further decouple and parallelize processing, the childchain management device 1020 may run on an independent server, and each childchain blockchain included in the hierarchical blockchain system by have one or more dedicated servers. By providing one or more servers dedicated to each childchain blockchain, the architecture described herein enhances the scalability of the hierarchical blockchain architecture.

The GTM computer system 800 retrieves transactions and other important from the blockchain by interfacing with a blockchain virtual machine 912 running on a blockchain node 910. In one implementation, the GTM computer system 800 passes one or more arguments to the blockchain virtual machine 912 to read the blocks (1041*a*-1041*c*) recorded on the blockchain running on the blockchain node 910. The blocks 1041*a*-1041*c* may include entries from one or more smart contracts included in the blockchain network's smart contract layer 1045. In one example, block 1041*b* includes data published to and/or generated by an auction smart contract 1045*a*, an audit smart contract 1045*b*, and a GTM smart contract 1045*c*. By reading the blockchain, the GTM computer system 800 can monitor activity of several deployed smart contracts. After collecting smart contract data from the blockchain, the GTM computer system 800 may arrange the smart contract data by the class of GTM operations the smart is facilitating (e.g., data from a container auction smart contract may be grouped with other logistics operation smart contract data). The GTM computer system 800 may then provide processed smart contract data to the GTM content service 900 for distribution to desktop applications 1001.

Additional resources on the blockchain node 910 may provide additional functionality to the smart contract layer 1045. An oracle 914 may allow one or more smart contracts to have conditions based on outside or off chain events. A distributed data service 916 may allow smart contracts to store large data files in a secure way. Messaging between blockchain nodes and communication with smart contracts may also be enhanced by a distributed message service 918.

The invention claimed is:

1. A method of a blockchain comprising:
storing, by a Global Trade Management (GTM) computer, at least one blockchain client;
generating, by the GTM computer, a smart contract for a GTM process, and deploying, by the blockchain client, the generated smart contract to an address of a virtual or physical computational machine on a childchain of the GTM process wherein the GTM process is selected from a group consisting of:
security surveys, database screenings, duty payments, valuation of goods, logistics operations, free trade zone operations, compliance verifications, import and export goods clearance events, goods transfer, and goods classification;
running, by the childchain, the smart contract on the virtual or physical computational machine; receiving, by the childchain, information from a third-party computer network or a system;
monitoring, by the executing smart contract, activity related to the GTM process on the childchain, by reading information received by the childchain;
determining, by the executing smart contract, that the read information requires a digital signature and based on the determination, pushing, by the executing smart contract, a signature verification prompt to the third-party computer network or a system;
receiving, by the executing smart contract, a digital signature, from the third-party computer network or a system; and adding, by the executing smart contract, the information to the childchain;
extracting global trade information from global trade documents;
assembling global trade information into childchain information blocks published on the global trade management childchain blockchain network; and
writing a summary of information published in blocks to a childchain summary block published on a global trade management subchain blockchain.

2. The method of claim 1, wherein the third-party computer includes a memory that stores at least one set of geo-specific trade, import and export compliance rules and regulations, one or more security screening databases, one or more private screening databases, a set of security survey forms, one or more goods classification and valuation schedules, public and/or private restricted persons and entities lists, and a security survey record listing all security surveys filed during the import or export process for the shipment of goods.

3. The method of claim 1, wherein the digital signature includes verification of completion of one or more off-chain aspects of the GTM process.

4. The method of claim 1, wherein each of the subchain nodes comprises a subchain virtual machine, a database, and a distributed data service.

5. The method of claim 2, further comprising the global trade management computer system including a subchain blockchain client interfacing with the global trade management subchain blockchain network, the subchain blockchain client writing childchain summary blocks to the subchain virtual machine and reading blocks published on the global trade management subchain blockchain.

6. The method of claim 1, wherein childchain information blocks include transportation information, customs information, compliance information, and free trade zone information.

7. The method of claim 1, wherein global trade documents include purchase orders, commercial invoices, transportation manifests, regulatory content database search results, and screening database search results.

8. The method of claim 1, wherein global trade information includes at least four of shipment descriptions, goods carriers, goods travel destinations, goods valuation metrics, customs vendors, customs clearance event statuses, duty payments records, regulations affecting a shipment, security database screening results, compliance approval events, approving officers, free trade zone shipment admissions records, origin of goods records, goods manipulation records, and intra free trade zone transportation records.

9. The method of claim 1, wherein data files written to the childchain virtual machine include smart contracts, childchain information blocks, and childchain summary blocks.

10. The method of claim 1, wherein the global trade management childchain is a logistics and freight forwarding childchain having logistics and freight forwarding childchain blocks comprising an information portion, a cryptographic hash of the previous block, and a cryptographic hash or the current block, the information portion comprising a shipment identification a logistics transaction ledger having a record of logistics events, and a digital signature.

11. The method of claim 1, wherein the global trade management computer system includes an off-chain logistics transport application having programming logic causing the processor to execute a series of operations generating expected and actual shipping costs for goods included in a shipment ID.

12. The method of claim 1, wherein the global trade management childchain is a customs clearance childchain having customs clearance childchain blocks comprising an information portion, a cryptographic hash of the previous block, and a cryptographic hash of the current block, the information portion comprising a shipment ID, an import and export customs filing record listing all documents filed during import or export processes for goods included in a shipment ID, goods valuation data, a duty transaction record listing all duty payments made during the import or export process for goods included in a shipment ID, and a digital signature.

13. The method of claim 1, wherein the global trade management computer system includes an off-chain customs clearance application having programming logic causing the processor to execute a series of operations valuing goods included in a shipment ID.

14. The method of claim 1, wherein the global trade management childchain is a trade regulation compliance childchain having trade regulation compliance childchain blocks comprising an information portion, a cryptographic hash of the previous block, and a cryptographic hash or the current block, the information portion comprising database screening results obtained by querying at least one name against a public restricted entities list, a security survey record listing all security surveys filed during the import or export process for goods included in a shipment ID, classification of goods included in a shipment ID, and a digital signature.

15. The method of claim 1, wherein the global trade management computer system includes an off-chain regulatory compliance application having programming logic causing the processor to execute a series of operations estimating classification of goods results for goods included in a shipment ID.

16. The method of claim 1, wherein the global trade management childchain is a free trade zone and warehouse management childchain having free trade zone and warehouse management childchain blocks comprising an information portion, a cryptographic hash of the previous block, and a cryptographic hash or the current block, the information portion comprising admission information listing all admissions of shipments of goods into a free trade zone, a product manipulations record listing all manipulations made to goods included in a shipment ID, a free trade zone transaction record listing all admissions, exits, and changes of ownership within a free trade zone for all goods included in a shipment ID, and a digital signature.

17. The method of claim 1, wherein the global trade management computer system includes an off-chain free trade zone application having programming logic causing the processor to execute a series of operations calculating the duty payment due upon exiting a free trade zone for goods included in a shipment ID.

* * * * *